(12) United States Patent
Prabhakar et al.

(10) Patent No.: US 12,270,900 B2
(45) Date of Patent: Apr. 8, 2025

(54) SYSTEM AND METHOD FOR ACOUSTIC IMAGING WITH AN ACCUMULATED-TIME VIEW

(71) Applicant: Fluke Corporation, Everett, WA (US)

(72) Inventors: Dileepa Prabhakar, Edmonds, WA (US); Michael D. Stuart, Issaquah, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 18/602,874

(22) Filed: Mar. 12, 2024

(65) Prior Publication Data

US 2024/0369704 A1    Nov. 7, 2024

Related U.S. Application Data

(63) Continuation of application No. 17/472,430, filed on Sep. 10, 2021, now Pat. No. 11,953,592.
(Continued)

(51) Int. Cl.
*G01S 15/89* (2006.01)
*G01S 15/08* (2006.01)
(Continued)

(52) U.S. Cl.
CPC .......... *G01S 15/8925* (2013.01); *G01S 15/08* (2013.01); *G01S 15/58* (2013.01); *G01S 17/89* (2013.01)

(58) Field of Classification Search
None
See application file for complete search history.

(56) References Cited

U.S. PATENT DOCUMENTS 5,778,082 A    7/1998  Chu et al.
7,538,326 B2   5/2009  Johnson et al.
(Continued)

FOREIGN PATENT DOCUMENTS

CN    208092219 U    11/2018
CN    110082756 A     8/2019
(Continued)

OTHER PUBLICATIONS

International Search Report and Written Opinion for International Application No. PCT/US2021/049965, mailing date Jan. 28, 2022, 13 pgs.

*Primary Examiner* — Daniel Pihulic
(74) *Attorney, Agent, or Firm* — Seed IP Law Group LLP

(57) ABSTRACT

An acoustic analysis system includes an acoustic sensor array that receives acoustic signals from a target scene and outputs acoustic data based on the received acoustic signals. A processor receives a plurality of acoustic data sets from the acoustic sensor array, representative of the target scene at different points in time. The processor determines one or more locations within the target scene represented by the plurality of acoustic data sets, each being a location of an acoustic signal emitted from the target scene. For each acoustic signal, the processor classifies the acoustic signal as an intermittent acoustic signal or a continuous acoustic signal, generates accumulated-time acoustic image data based on the plurality of acoustic data sets, and generates an accumulated-time display image for presentation on a display. Within the accumulated-time display image, acoustic signals classified as intermittent acoustic signals are distinguished from acoustic signals classified as continuous acoustic signals.

20 Claims, 18 Drawing Sheets

Related U.S. Application Data

(60) Provisional application No. 63/077,445, filed on Sep. 11, 2020.

(51) Int. Cl.
    *G01S 15/58*     (2006.01)
    *G01S 17/89*     (2020.01)

(56) References Cited

U.S. PATENT DOCUMENTS

| | | |
|---|---|---|
| 7,873,521 B2 | 1/2011 | Kurozumi et al. |
| 9,116,111 B2 | 8/2015 | Nakajima et al. |
| 9,232,142 B2 | 1/2016 | McManus et al. |
| 10,152,811 B2 | 12/2018 | Johnson et al. |
| 10,446,172 B2 | 10/2019 | Kim |
| 11,953,592 B2 * | 4/2024 | Prabhakar ........... G01N 29/0654 |
| 2013/0155248 A1 | 6/2013 | Neeley et al. |
| 2013/0155249 A1 | 6/2013 | Neeley et al. |
| 2013/0162835 A1 | 6/2013 | Forland et al. |
| 2022/0082691 A1 * | 3/2022 | Prabhakar .............. G01N 29/14 |
| 2022/0082692 A1 | 3/2022 | Prabhakar et al. |
| 2024/0369704 A1 * | 11/2024 | Prabhakar ........... G01S 15/8925 |

FOREIGN PATENT DOCUMENTS

| | | | |
|---|---|---|---|
| CN | 116249914 A * | 6/2023 | ......... G01N 29/0654 |
| JP | 2012-21969 A | 2/2012 | |
| JP | 5822667 B2 | 11/2015 | |
| JP | 6367691 B2 | 8/2018 | |
| WO | 2020/023622 A1 | 1/2020 | |
| WO | 2020/023627 A1 | 1/2020 | |
| WO | 2020/023629 A1 | 1/2020 | |
| WO | 2020/023631 A1 | 1/2020 | |
| WO | 2020/023633 A1 | 1/2020 | |
| WO | WO-2022056327 A1 * | 3/2022 | ......... G01N 29/0654 |

* cited by examiner

SYSTEM AND METHOD FOR ACOUSTIC IMAGING WITH AN ACCUMULATED-TIME VIEW

BACKGROUND

For some area monitoring applications, it may be necessary to monitor an area where problems only become apparent over a period of time. Sometimes, these problems may be intermittent and may be missed with periodic checks.

In some cases, different features within a field of view of an acoustic imaging system have different acoustic signatures, which can make analyzing an individual portion of the field of view difficult. For example, a first portion of a target scene may include a first piece of equipment that is typically loud, even when operating normally, while a second portion of the target scene may include a second piece of equipment that usually is much quieter than the first, but becomes louder while malfunctioning. Detecting the malfunction may be difficult due to the expected presence of the louder sound emitted from the first piece of equipment.

DETAILED DESCRIPTION

Figure 1B:
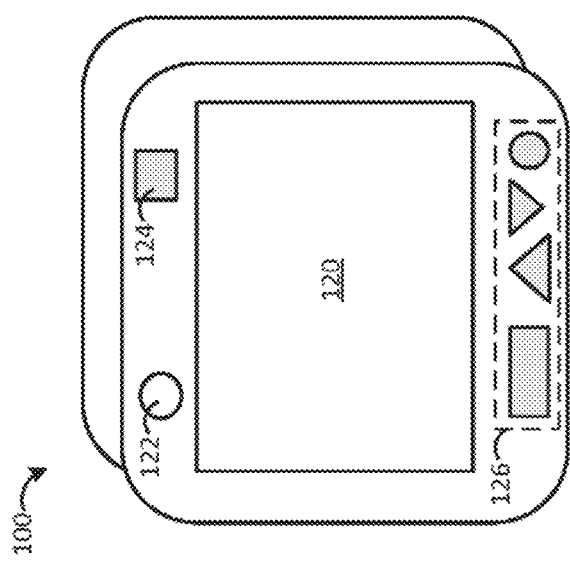
FIGS. 1A and 1B show front and back views of an example acoustic imaging device.
Figure 1A:
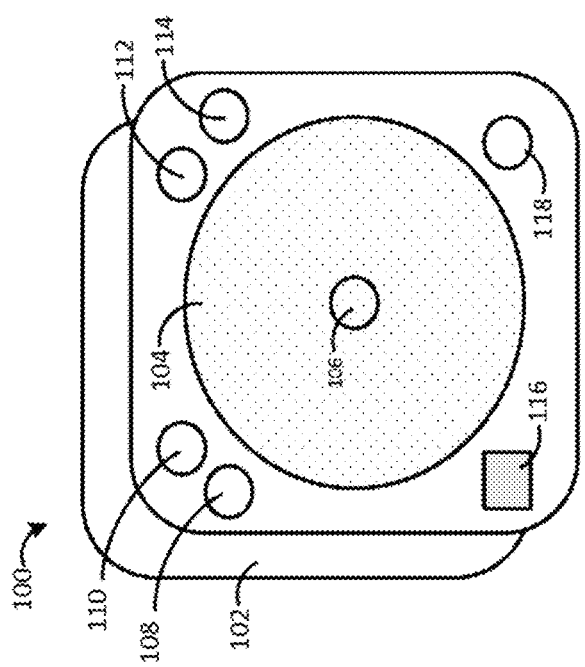

FIGS. 1A and 1B show front and back views of an example acoustic imaging device. FIG. 1A shows a front side of an acoustic imaging device 100 having a housing 102 supporting an acoustic sensor array 104 and an electromagnetic imaging tool 106. In some embodiments, the acoustic sensor array 104 includes a plurality of acoustic sensor elements, each of the plurality of acoustic sensor elements being configured to receive (e.g., passively) acoustic signals that are emitted from an acoustic scene and output acoustic data based on the received acoustic signals. The electromagnetic imaging tool 106 can be configured to receive electromagnetic radiation from a target scene and output electromagnetic image data representative of the received electromagnetic radiation. The electromagnetic imaging tool 106 can be configured to detect electromagnetic radiation in one or more of a plurality of ranges of wavelengths, such as visible light, infrared, ultraviolet, or the like.

In the illustrated example, the acoustic imaging device 100 includes an ambient light sensor 108 and a location sensor 116, such as a GPS. The device 100 includes a laser pointer 110, which in some embodiments, includes a laser distance meter. The device 100 includes a torch 112, which can be configured to emit visible light radiation toward a scene, and an infrared illuminator 118, which can be configured to emit infrared radiation toward a scene. In some examples, device 100 can include an illuminator for illuminating a scene over any range of wavelengths. Device 100 further includes a projector 114, such as an image reprojector, which can be configured to project a generated image onto a scene, such as a colorized image, and/or a dot projector configured to project a series of dots onto a scene, for example, to determine a depth profile of the scene.

FIG. 1B shows a back side of the acoustic imaging device 100. As shown, the device includes display 120, which can present image or other data. In some examples, display 120 comprises a touch screen display. The acoustic imaging device 100 includes a speaker, which can provide audio feedback signals to a user, and a wireless interface 124, which can enable wireless communication between the acoustic imaging device 100 and an external device. The device further includes controls 126, which can include one or more buttons, knobs, dials, switches, or other interfacing components to enable a user to interface with the acoustic imaging device 100. In some examples, controls 126 and a touchscreen display combine to provide a user interface of the acoustic imaging device 100.

In various embodiments, acoustic imaging devices need not include every element shown in the embodiment of FIGS. 1A and 1B. One or more illustrated components can be excluded from an acoustic imaging device. In some examples, one or more components shown in the embodiment of FIGS. 1A and 1B can be included as a part of an acoustic imaging system but included separately from the housing 102. Such components can communicate with other components of an acoustic imaging system via wired or wireless communication techniques, for example, using wireless interface 124.

Figure 2:
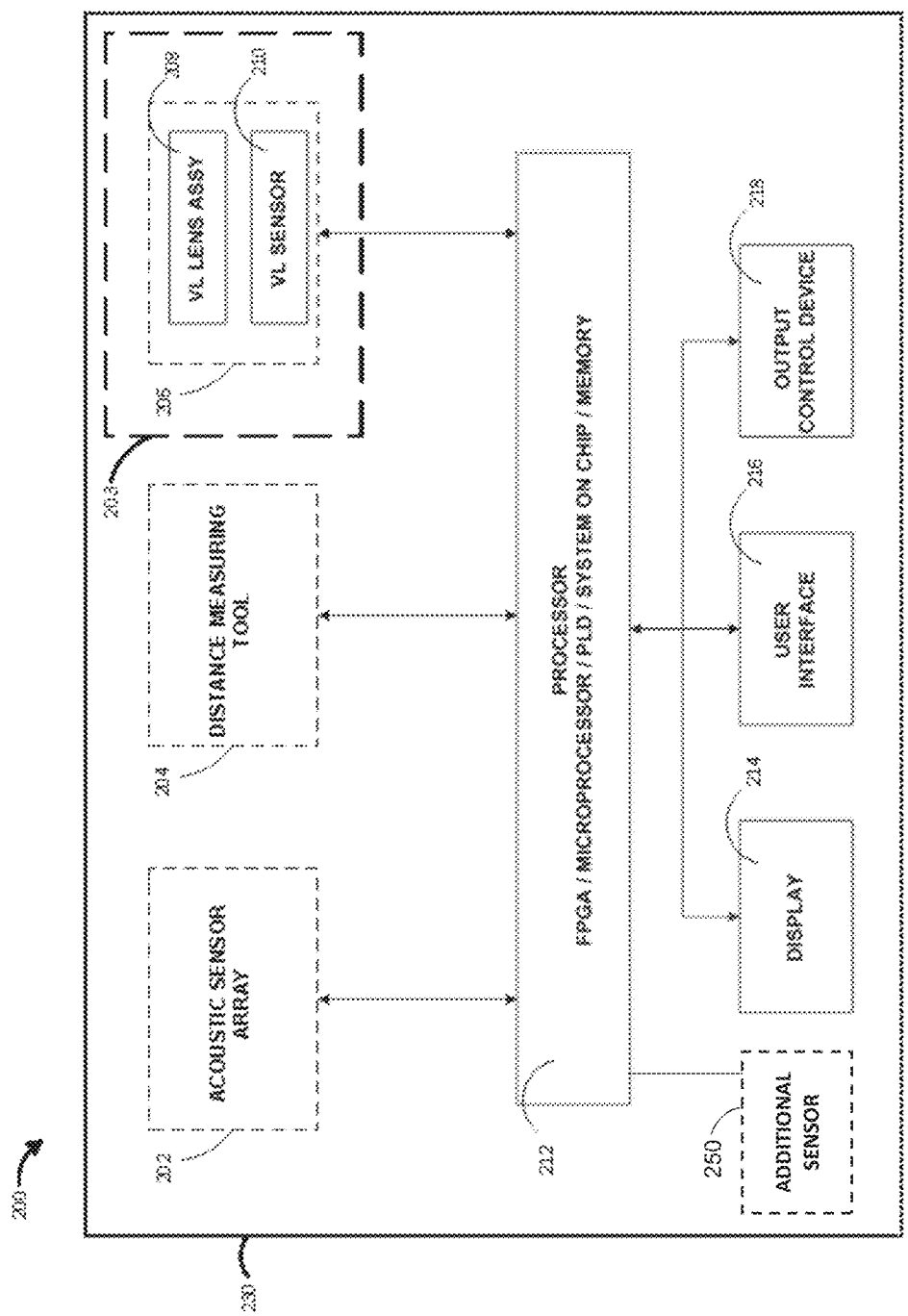
FIG. 2 is a functional block diagram illustrating components of an example of acoustic analysis system.

FIG. 2 is a functional block diagram illustrating components of an example of acoustic analysis system 200. The exemplary acoustic analysis system 200 of FIG. 2 can include a plurality of acoustic sensors such as microphones, MEMS, transducers, etc. arranged in an acoustic sensor array 202 to capture acoustic signals travelling through the air. Such arrays can be one-dimensional, two-dimensional, or three-dimensional. In various examples, the acoustic sensor array can define any suitable size and shape. In some examples, acoustic sensor array 202 includes a plurality of acoustic sensors arranged in a grid pattern such as, e.g., an array of sensor elements arranged in vertical columns and horizontal rows. In various examples, acoustic sensor array 202 can include an array of vertical columns by horizontal rows of, e.g., 8×8, 16×16, 32×32, 64×64, 128×128, 256× 256, etc. Other examples are possible, and various sensor arrays need not necessarily include the same number of rows as columns. In some embodiments, such sensors can be positioned on a substrate, for example, such as a printed circuit board (PCB) substrate.

In the configuration shown in FIG. 2, a processor 212 in communication with the acoustic sensor array 202 can receive acoustic data from each of the plurality of acoustic sensors. During exemplary operation of acoustic analysis system 200, processor 212 can communicate with acoustic sensor array 202 to generate acoustic image data. For example, processor 212 can be configured to analyze data received from each of a plurality of acoustic sensors arranged in the acoustic sensor array and determine an acoustic scene by "back propagating" acoustic signals to the source of the acoustic signals. In some embodiments, processor 212 can generate a digital "frame" of acoustic image data by identifying various source locations and intensities of acoustic signals across a two-dimensional scene. By generating a frame of acoustic image data, processor 212 captures an acoustic image of a target scene at substantially a given point in time. In some examples, a frame comprises a plurality of pixels making up the acoustic image, wherein each pixel represents a portion of the source scene to which acoustic signals have been back-propagated.

Components described as processors within the acoustic analysis system 200, including processor 212, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 212 may also include memory that stores program instructions and related data that, when executed by processor 212, cause acoustic analysis system 200 and processor 212 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow acoustic image data to be easily transferred to another computing device, or to be removed before acoustic analysis system 200 is used in another application. Processor 212 may also be implemented as a System on Chip that integrates some or all components of a computer or other electronic system into a single chip. The processor 212 (processing circuitry) can be configured to communicate the processed data to a display 214 or other output/control device 218.

In some embodiments, acoustic sensors in acoustic sensor array 202 generate a series of signals corresponding to the acoustic signals received through the air by each acoustic sensor to represent an acoustic image. A "frame" of acoustic image data is generated when the signal from each acoustic sensor is obtained by scanning all of the rows that make up the acoustic sensor array 202. In some examples, processor 212 can acquire acoustic image frames at a rate sufficient to generate a video representation (e.g., 30 Hz, or 60 Hz) of the acoustic image data. Independent of the specific circuitry, acoustic analysis system 200 may be configured to manipulate acoustic data representative of the acoustic profile of a target scene so as to provide an output that can be displayed, stored, transmitted, or otherwise utilized by a user.

In some embodiments, the "back propagation" of received acoustic signals in order to generate acoustic image data comprises analyzing the received signals at the plurality of acoustic sensors in the acoustic sensor array 202, for example, via the processor. In various examples, performing the back propagation is a function of one or more parameters, including a distance to target, frequency, sound intensity (e.g., dB level) sensor array dimensions/configuration, including, for example, the spacing and arrangement of individual sensors within one or more arrays, etc. In some embodiments, such parameters can be pre-programmed into the system, for example, in memory. For example, acoustic sensor array 202 properties can be stored in memory, such as internal memory or memory associated particularly with the acoustic sensor array 202.

Other parameters, such as a distance to target, can be received a variety of ways. For instance, in some examples, the acoustic analysis system 200 includes a distance measuring tool 204 in communication with the processor 212. The distance measuring tool can be configured to provide distance information representative of the distance from the distance measuring tool 204 to a particular location in the target scene. Various distance measuring tools can include a laser distance meter or other known distance measuring devices, such as other optical or audio distance measurement devices. Additionally or alternatively, a distance measuring tool can be configured to generate three-dimensional depth data such that each portion of a target scene has an associated distance-to-target value. Thus, in some examples, a distance to target measurement as used herein can correspond to a distance to each location within a target scene. Such three-dimensional depth data can be generated, for example, via a plurality of imaging tools having different view of a target scene, or via other known distance scanning tools. In general, in various embodiments, a distance measuring tool can be used to perform one or more distance measurement functions, including but not limited to: laser distance measurement, active sonic distance measurement, passive ultrasonic distance measurement, LIDAR distance measurement, RADAR distance measurement, millimeter wave distance measurement, and the like.

Distance information from the distance measuring tool 204 can be used in the back propagation calculation. Additionally or alternatively, the system 200 can include a user interface 216 into which a user may manually enter a distance to target parameter. For example, a user may enter a distance to target value into the system 200 in the event that the distance to a component suspected of producing acoustic signals is known or is difficult to measure with the distance measuring tool 204.

In the illustrated embodiment, acoustic analysis system 200 includes an electromagnetic imaging tool 203 for generating image data representative of a target scene. Exemplary electromagnetic imaging tools can be configured to receive electromagnetic radiation from a target scene and generate electromagnetic image data representative of the received electromagnetic radiation. In some examples, electromagnetic imaging tool 203 can be configured to generate electromagnetic image data representative of a particular range of wavelengths within the electromagnetic spectrum, such as infrared radiation, visible light radiation, and ultraviolet radiation. For instance, in some embodiments, an electromagnetic timing tool 203 can include one or more camera modules configured to generate image data representative of a particular range of wavelengths in the electromagnetic spectrum such as, for example, a visible light camera module 206.

Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 214 and/or stored in memory. Visible light camera module 206 can include any suitable components for performing the functions attributed to the module herein. In the example of FIG. 2, visible light camera module 206 is illustrated as including visible light lens assembly 208 and visible light sensor 210. In some such embodiments, visible light lens assembly 208 includes at least one lens that takes visible light energy emitted by a target scene and focuses the visible light energy on visible light sensor 210. Visible light sensor 210 can include a plurality of visible light sensor elements such as, e.g., CMOS detectors, CCD detectors, PIN diodes, avalanche photo diodes, or the like. Visible light sensor 210 responds to the focused energy by generating an electrical signal that can be converted and displayed as a visible light image on display 214. In some examples, the visible light module 206 is configurable by a user, and can provide output, for example, to display 214, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

In operation of some exemplary visible light camera modules 206, optical energy received from a target scene may pass through visible light lens assembly 208 and be focused on visible light sensor 210. When the optical energy impinges upon the visible light sensor elements of visible light sensor 210, photons within the photodetectors may be released and converted into a detection current. Processor 212 can process this detection current to form a visible light image of the target scene.

During use of acoustic analysis system 200, processor 212 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 212 can generate a "frame" of visible light image data by measuring the response of each visible light sensor element of acoustic analysis system 200 a single time. By generating a frame of visible light data, processor 212 captures visible light image of a target scene at a given point in time. Processor 212 may also repeatedly measure the response of each visible light sensor element of acoustic analysis system 200 so as to generate a dynamic visible light image (e.g., a video representation) of a target scene. In some examples, the visible light camera module 206 may include its own dedicated processor or other circuitry (e.g., ASIC) capable of operating the visible light camera module 206. In some such embodiments, the dedicated processor is in communication with processor 212 for providing visible light image data (e.g., RGB image data) to processor 212. In alternative embodiments, a dedicated processor for the visible light camera module 206 may be integrated into processor 212.

With each sensor element of visible light camera module 206 functioning as a sensor pixel, processor 212 can generate a two-dimensional image or picture representation of the visible light from a target scene by translating an electrical response of each sensor element into a time-multiplexed electrical signal that can be processed, e.g., for visualization on display 214 and/or storage in memory.

Processor 212 may control display 214 to display at least a portion of a visible light image of a captured target scene. In some examples, processor 212 controls display 214 so that the electrical response of each sensor element of visible light camera module 206 is associated with a single pixel on display 214. In other examples, processor 212 may increase or decrease the resolution of a visible light image so that there are more or fewer pixels displayed on display 214 than there are sensor elements in visible light camera module 206. Processor 212 may control display 214 to display an entire visible light image (e.g., all portions of a target scene captured by acoustic analysis system 200) or less than an entire visible light image (e.g., a lesser port of the entire target scene captured by acoustic analysis system 200).

In some embodiments, processor 212 may control display 214 to concurrently display at least a portion of the visible light image captured by acoustic analysis system 200 and at least a portion of an acoustic image generated via acoustic sensor array 202. Such a concurrent display may be useful in that an operator may reference the features displayed in the visible light image to help view sources of acoustic signals concurrently displayed in the acoustic image. In some cases, the processor 212 is configured to recognize one or more features within the electromagnetic (e.g., visible light) image data and designate (identify or delineate) at least one portion of the acoustic image data based on the one or more recognized features. In various examples, processor 212 may control display 214 to display the visible light image and the acoustic image in side-by-side arrangement, in a picture-in-picture arrangement, where one of the images surrounds the other of the images, or any other suitable arrangement where the visible light and the acoustic image are concurrently displayed.

For example, processor 212 may control display 214 to display the visible light image and the acoustic image in a combined arrangement. In such an arrangement, for a pixel or set of pixels in the visible light image representative of a portion of the target scene, there exists a corresponding pixel or set of pixels in the acoustic image, representative of substantially the same portion of the target scene. In various embodiments, the size and/or resolution of the acoustic and visible light images need not be the same. Accordingly, there may exist a set of pixels in one of the acoustic or visible light images that correspond to a single pixel in the other of the acoustic or visible light image, or a set of pixels of a different size. Similarly, there may exist a pixel in one of the visible light or acoustic images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single acoustic pixel has a plurality of corresponding visible light pixels, or a visible light pixel has a plurality of corresponding acoustic pixels. Additionally or alternatively, in some embodiments, not all visible light pixels have corresponding acoustic pixels, or vice versa. Such embodiments may be indicative of, for example, a picture-in-picture type display as previously discussed. Thus, a visible light pixel will not necessarily have the same pixel coordinate within the visible light image as does a corresponding acoustic pixel. Accordingly, as used herein, corresponding pixels generally refers pixels from any image (e.g., a visible light image, an acoustic image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the acoustic image may be superimposed on top of one another, at corresponding pixels. An operator may interact with user interface 216 to control the transparency or opaqueness of one or both of the images displayed on display 214. For example, the operator may interact with user interface 216 to adjust the acoustic image between being completely transparent and completely opaque and also adjust the visible light image between being completely transparent and completely opaque. Such an exemplary combined arrangement, which may be referred to as an alpha-blended arrangement, may allow an operator to adjust display 214 to display an acoustic-only image, a visible light-only image, of any overlapping combination of the two images between the extremes of an acoustic-only image and a visible light-only image. Processor 212 may also combine scene information with other data, such as alarm data or the like. In general, an alpha-blended combination of visible light and acoustic images can comprise anywhere from 100 percent acoustic and 0 percent visible light to 0 percent acoustic and 100 percent visible light. In some embodiments, the amount of blending can be adjusted by a user of the camera. Thus, in some embodiments, a blended image can be adjusted between 100 percent visible light and 100 percent acoustic.

Additionally, in some embodiments, the processor 212 can interpret and execute commands from user interface 216, and/or output/control device 218. Moreover, input signals may be used to alter the processing of the visible light and/or acoustic image data that occurs in the processor 212. An operator may interact with acoustic analysis system 200 via user interface 216, which may include buttons, keys, or another mechanism for receiving input from a user. The operator may receive output from acoustic analysis system 200 via display 214. Display 214 may be configured to display an acoustic-image and/or a visible light image in any acceptable palette, or color scheme, and the palette may vary, e.g., in response to user control. In some embodiments, acoustic image data can be presented in a palette in order to represent varying magnitudes of acoustic data from different locations in the scene. For instance, in some examples, display 214 is configured to display an acoustic image in a monochromatic palette such as grayscale. In other examples, display 214 is configured to display an acoustic image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 212. For example, processor 212 may generate values (e.g., RGB values, grayscale values, or other display options) for each pixel to be displayed. Display 214 may receive such information and map each pixel into a visual display.

While processor 212 can control display 214 to concurrently display at least a portion of an acoustic image and at least a portion of a visible light image in any suitable arrangement, a picture-in-picture arrangement may help an operator to easily focus and/or interpret an acoustic image by displaying a corresponding visible image of the same scene in adjacent alignment.

A power supply (not shown) delivers operating power to the various components of acoustic analysis system 200. In various examples, power supply may include a rechargeable or non-rechargeable battery and a power generation circuit, AC power, an inductive power pick-up, a photovoltaic power source, or any other appropriate power supplying component. Combinations of power supplying components are also possible, such as a rechargeable battery and another component configured to provide power to operate the device and/or to charge the rechargeable battery.

During operation of acoustic analysis system 200, processor 212 controls acoustic sensor array 202 and visible light camera module 206 with the aid of instructions associated with program information that is stored in memory to generate a visible light image and an acoustic image of a target scene. Processor 212 further controls display 214 to display the visible light image and/or the acoustic image generated by acoustic analysis system 200.

As noted, in some situations, it can be difficult to identify and differentiate between real-world (visible) features of the target scene in an acoustic image. In addition to supplementing the acoustic image with visible light information, in some embodiments, it can be useful to emphasize visible edges within the target scene. In some embodiments, known edge detection methods can be performed on a visible light image of a target scene. Because of the corresponding relationship between the acoustic image and the visible light image, visible light pixels determined to represent a visible edge in the target scene correspond to acoustic pixels also representing the visible edge in the acoustic image. It will be appreciated that, as used herein, "edges" need not refer to the physical boundary of an object, but may refer to any sufficiently sharp gradient in the visible light image. Examples may include physical boundaries of an object, color changes within an object, shadows across a scene, and the like.

While generally described with respect to FIG. 2 as including a visible light camera module 206, in some examples, electromagnetic imaging tool 203 of acoustic analysis system 200 can additionally or alternatively include imaging tools capable of generating image data representative of a variety of spectrums. For instance, in various examples, electromagnetic imaging tool 203 can include one or more tools capable of generating infrared image data, visible light image data, ultraviolet image data, or any other useful wavelengths, or combinations thereof. In some embodiments, the acoustic imaging system can include an infrared camera module having an infrared lens assembly and an infrared sensor array. Additional components for interfacing with, for example, an infrared camera module can be included, such as those described in U.S. patent application Ser. No. 14/837,757, filed Aug. 27, 2015, and entitled "EDGE ENHANCEMENT FOR THERMAL-VIS- IBLE COMBINED IMAGES AND CAMERAS," which is assigned to the assignee of the instant application and is hereby incorporated by reference in its entirety.

In some examples, two or more data streams can be blended for display. For example, exemplary systems including a visible light camera module 206, an acoustic sensor array 202, and an infrared camera module (not shown in FIG. 2) can be configured to produce an output image comprising a blend of visible light (VL) image data, infrared (IR) image data, and acoustic (Acoustic) image data. In an exemplary blending scheme, the display image can be represented by: $\alpha \times IR + \beta \times VL + \gamma \times Acoustic$, wherein $\alpha + \beta + \gamma = 1$. In general, any number of data streams can be combined for display. In various embodiments, blending ratios such as $\alpha$, $\beta$, and $\gamma$ can be set by a user. Additionally or alternatively, set display programs can be configured to include different image data streams based on alarm conditions (e.g., one or more values in one or more data streams meets a predetermined threshold) or other conditions, for example, as described in U.S. Pat. No. 7,538,326, entitled "VISIBLE LIGHT AND IR COMBINED IMAGE CAMERA WITH A LASER POINTER," which is assigned to the assignee of the instant application, and is hereby incorporated by reference in its entirety.

The example of FIG. 2 further includes an additional sensor 250. Additional sensor 250 can be configured to provide auxiliary data to the processor. Such data can include information related to one or more environmental or other contextual parameters associated with the acoustic analysis system 200. For example, in some cases, additional sensor 250 can include a humidity sensor, temperature sensor, position sensor (e.g., GPS sensor), one or more orientation sensors, current sensors, voltage sensors, or other appropriate sensors. While sensor 250 is shown in FIG. 2, in general, acoustic analysis systems can include any number of additional sensors associated therewith and in communication with the processor.

One of more components in acoustic analysis system 200 described with respect to FIG. 2 can be included in a portable (e.g., handheld) acoustic analysis tool. For instance, in some embodiments, a portable acoustic analysis tool can include a housing 230 configured to house the components in the acoustic analysis tool. In some examples, one or more components of the system 200 can be located external to housing 230 of an acoustic analysis tool. For instance, in some embodiments, processor 212, display 214, user interface 216, and/or output control device 218 can be located external to a housing of an acoustic analysis tool and can communicate with various other system components, for example, via wireless communication (e.g., Bluetooth communication, Wi-Fi, etc.). Such components external to the acoustic analysis tool can be provided, for example, via an external device, such as a computer, smartphone, tablet, wearable device, or the like. Additionally or alternatively, other test and measurement or data acquisition tools configured to act as a master or slave device with respect to the acoustic analysis tool can similarly provide various components of an acoustic analysis system external to the acoustic analysis tool. External devices can communicate with a portable acoustic analysis tool via a wired and/or wireless connection, and can be used to perform various processing, display, and/or interface steps. For example, in some embodiments, one or more additional sensors (e.g., additional sensor 250) can be located external to one or more components of the acoustic analysis system 200 (e.g., outside of housing 230) and communicate with processor 212 wirelessly.

In some embodiments, such external devices can provide redundant functionality as components housed in a portable acoustic analysis tool. For example, in some embodiments, an acoustic analysis tool can include a display for displaying acoustic image data and can further be configured to communicate image data to an external device for storage and/or display. Similarly, in some embodiments, a user may interface with an acoustic analysis tool via an application (an "app") running on a smartphone, tablet, computer or the like, in order to perform one or more functions also capable of being performed with the acoustic analysis tool itself.

Figure 3A:
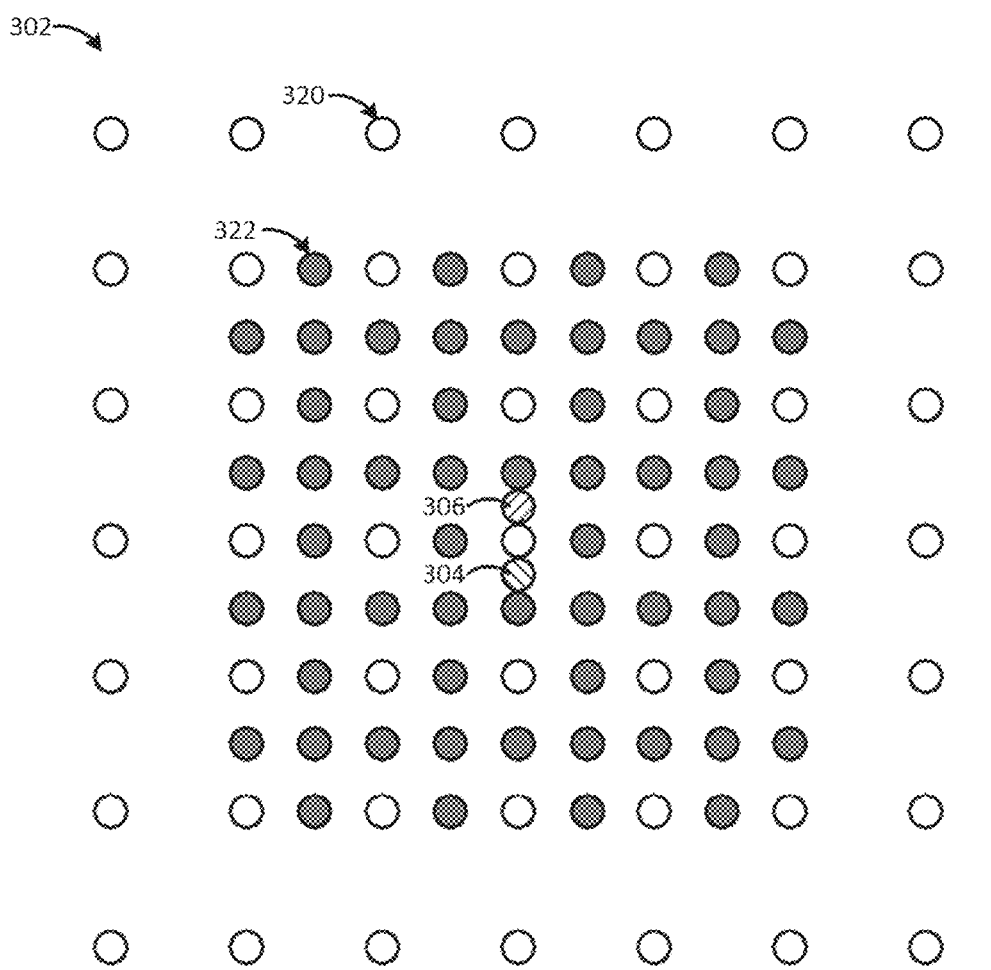
FIGS. 3A, 3B, 3C, and 3D show schematic diagrams of exemplary acoustic sensor array configurations within an acoustic analysis system.

FIG. 3A is a schematic diagram of an exemplary configuration of acoustic sensor array within an acoustic analysis system. In the illustrated example, the acoustic sensor array 302 includes a plurality of first acoustic sensors (shown in white) and a plurality of second acoustic sensors (shaded). The first acoustic sensors are arranged into a first array 320, and the second acoustic sensors are arranged into a second array 322. In some examples, the first array 320 and the second array 322 can be selectively used to, e.g., passively, receive acoustic signals through the air and generate corresponding acoustic image data. For instance, in some configurations, the sensitivity of a particular acoustic sensor array to particular acoustic frequencies is a function of the distance between acoustic sensor elements.

In some configurations, more closely spaced together sensor elements (e.g., second array 322) are better able to resolve higher frequency acoustic signals (for example, sounds having frequencies greater than 20 kHz, such as ultrasound signals between 20 kHz and 100 kHz) than further spaced sensor elements (e.g., first array 320). Similarly, further spaced sensor elements (e.g., first array 320) may be better suited for detecting lower frequency acoustic signals (e.g., <20 kHz) than more closely spaced sensor elements (e.g., second array 322). Various acoustic sensor arrays can be provided having sensor elements spaced apart from one another for detecting acoustic signals of various frequency ranges, such as infrasonic frequencies (<20 Hz), audible frequencies (between approximately 20 Hz and 20 kHz), ultrasound frequencies (between 20 kHz and 100 kHz). In some embodiments, partial arrays can be used (e.g., every other acoustic sensor element from array 320) for optimizing detection of particular frequency bands.

Additionally, in some examples, some acoustic sensor elements may be better suited for detecting acoustic signals having different frequency characteristics, such as low or high frequencies. Thus, in some embodiments, an array configured for detecting low frequency acoustic signals, such as the first array 320 having further spaced sensor elements, may include first acoustic sensor elements better suited for detecting low frequency acoustic signals. Similarly, an array configured for detecting higher frequency acoustic signals, such as second array 322, may include second acoustic sensor elements better suited for detecting high frequency acoustic signals. Thus, in some examples, the first array 320 and the second array 322 of acoustic sensor elements may include different types of acoustic sensor elements. Alternatively, in some embodiments, the first array 320 and the second array 322 can include the same type of acoustic sensor element.

Thus, in an exemplary embodiment, an acoustic sensor array 302 can include a plurality of acoustic sensor element arrays, such as the first array 320 and the second array 322. In some embodiments, arrays can be used individually or in combination. For instance, in some examples, a user may select to use the first array 320, use the second array 322, or use both the first array 320 and the second array 322 simultaneously for performing an acoustic imaging procedure. In some examples, a user may select which array(s) are to be used via the user interface. Additionally or alternatively, in some embodiments, the acoustic analysis system may automatically select the array(s) to use based on analysis of received acoustic signals or other input data, such as an expected frequency range, or the like. While the configuration shown in FIG. 3A generally includes two arrays (first array 320 and second array 322) generally arranged in rectangular lattices, it will be appreciated that a plurality of acoustic sensor elements can be grouped into any number of discrete arrays in any shape. Moreover, in some embodiments, one or more acoustic sensor elements can be included in multiple distinct arrays that can be selected for operation. As described elsewhere herein, in various embodiments, processes for back propagating acoustic signals to establish acoustic image data from the scene is performed based on the arrangement of acoustic sensor elements. Thus, the arrangement of acoustic sensors may be known or otherwise accessible by the processor in order to perform acoustic image generation techniques.

The acoustic analysis system of FIG. 3A further includes a distance measuring tool 304 and a camera module 306 positioned within the acoustic sensor array 302. Camera module 306 can represent a camera module of an electromagnetic imaging tool (e.g., 203), and can include a visible light camera module, an infrared camera module, an ultraviolet camera module, or the like. Additionally, while not shown in FIG. 3A, the acoustic analysis system can include one or more additional camera modules of the same type or of a different type than camera module 306. In the illustrated example, distance measuring tool 304 and camera module 306 are positioned within the lattice of acoustic sensor elements in the first array 320 and the second array 322. While shown as being disposed between lattice sites within the first array 320 and the second array 322, in some embodiments, one or more components (e.g., camera module 306 and/or a distance measuring tool 304 can be positioned at corresponding one or more lattice sites in the first array 320 and/or the second array 322. In some such embodiments, the component(s) can be positioned at the lattice site in lieu of an acoustic sensor element that would typically be in such a location according to the lattice arrangement.

Figure 3C:
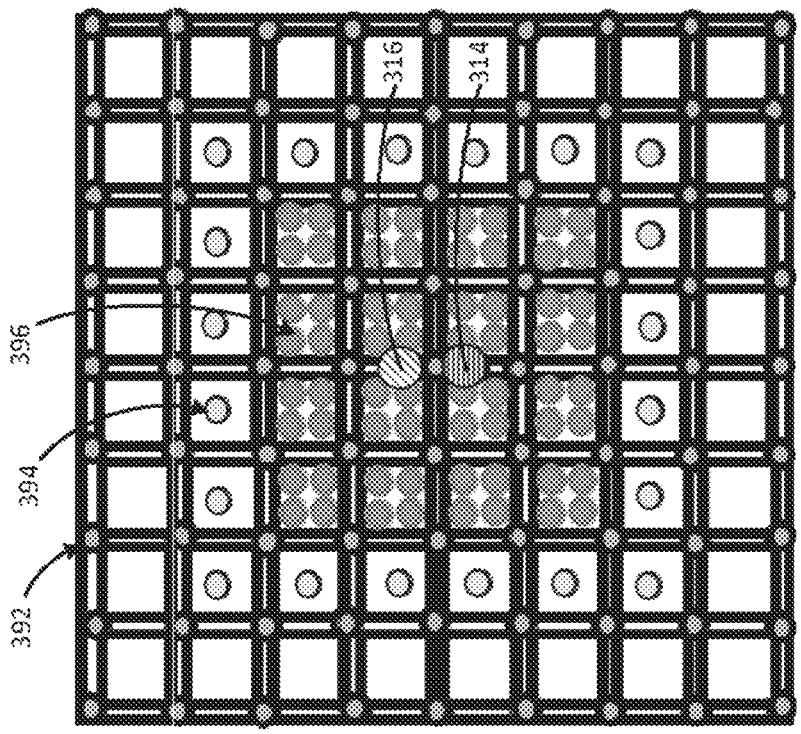
Figure 3B:
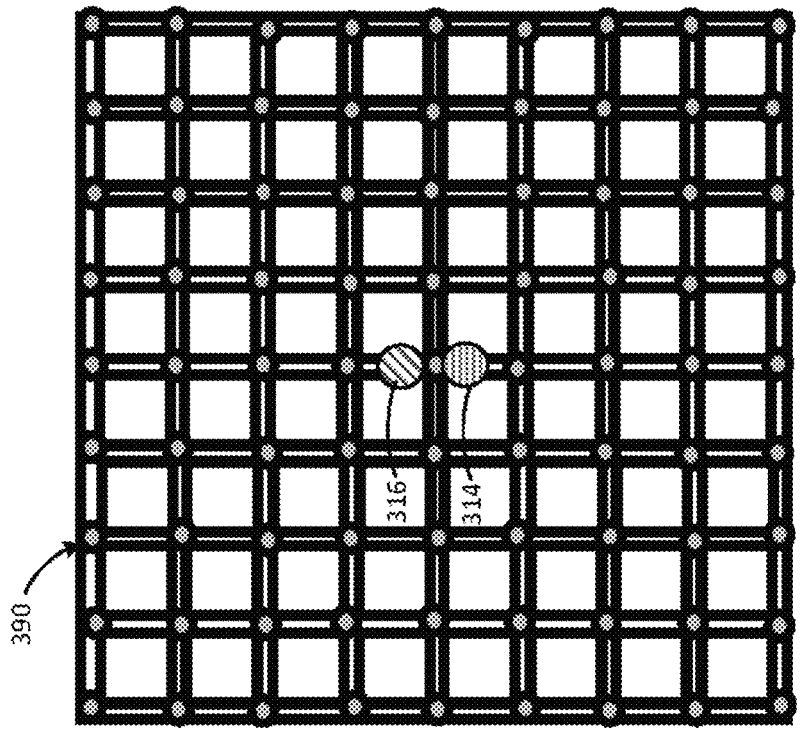

As described elsewhere herein, acoustic sensor arrays can include acoustic sensor elements arranged in any of a variety of configurations to receive, through the air, acoustic signals emitted from an acoustic source located in or near a target scene. FIGS. 3B and 3C are schematic diagrams illustrating exemplary acoustic sensor array configurations. FIG. 3B shows an acoustic sensor array 390 that includes a plurality of acoustic sensor elements spaced evenly apart in an approximately square lattice. Distance measuring tool 314 and camera array 316 are positioned within acoustic sensor array 390. In the illustrated example, the acoustic sensor elements in acoustic sensor array 390 are the same type of sensor, though in some embodiments, different types of acoustic sensor elements can be used in the array 390.

FIG. 3C shows a plurality of acoustic sensor arrays. Acoustic sensor arrays 392, 394, and 396 each include a plurality of acoustic sensor elements arranged in a different shaped array. In the example of FIG. 3C, acoustic sensor arrays 392, 394, and 396 can be used separately or together in any combination to create sensor arrays of various sizes. In the illustrated embodiment, the sensor elements of array 396 are spaced closer together than the sensor elements of array 392. In some examples, array 396 is designed for sensing higher frequency acoustic signals, while array 392 is designed for sensing lower frequency acoustic signals.

In various embodiments, arrays 392, 394, and 396 can include the same or different types of acoustic sensor elements. For example, acoustic sensor array 392 can include sensor elements having a frequency operating range lower than that of sensor elements of acoustic sensor array 396.

As described elsewhere herein, in some examples, different acoustic sensor arrays (e.g., 392, 394, 396) can be selectively turned off and on during various modes of operation (e.g., different desired frequency spectrums to be imaged). Additionally or alternatively, various acoustic sensor elements (e.g., some or all of acoustic sensor elements in one or more sensor arrays) can be enabled or disabled according to a desired system operation. For example, in some acoustic imaging processes, while data from a large number of sensor elements (e.g., sensor elements arranged in a high density, such as in sensor array 396) marginally improves acoustic image data resolution, it is at the expense of required processing to extract acoustic image data from the data received at each sensor element. That is, in some examples, the increased processing demand (e.g., in cost, processing time, power consumption, etc.) necessary for processing a large number of input signal (e.g., from a large number of acoustic sensor elements) compares negatively to any additional signal resolution provided by the additional data streams. Thus, it may be worthwhile in some embodiments to disable or disregard data from one or more acoustic sensor elements depending on the desired acoustic imaging operation.

Similar to the systems of FIGS. 3A and 3B, the system of FIG. 3C includes distance measuring tool 314 and camera array 316 positioned within acoustic sensor arrays 392, 394, and 396. In some examples, additional components, such as additional camera arrays (e.g., used for imaging a different portion of the electromagnetic spectrum from camera array 316), may be similarly positioned within acoustic sensor arrays 392, 394, and 396. It will be appreciated that, while shown in FIGS. 3A-3C as being positioned within one or more acoustic sensor arrays, distance measuring tool and/or one or more imaging tools (e.g., visible light camera module, infrared camera module, ultraviolet sensor, etc.) can be located outside of the acoustic sensor array(s). In some such examples, the distance measuring tool and/or one or more imaging tools located outside of the acoustic sensor array(s) can be supported by an acoustic imaging tool, for example, by a housing that houses the acoustic sensor array(s), or can located externally to the housing of the acoustic imaging tool.

Figure 3D:
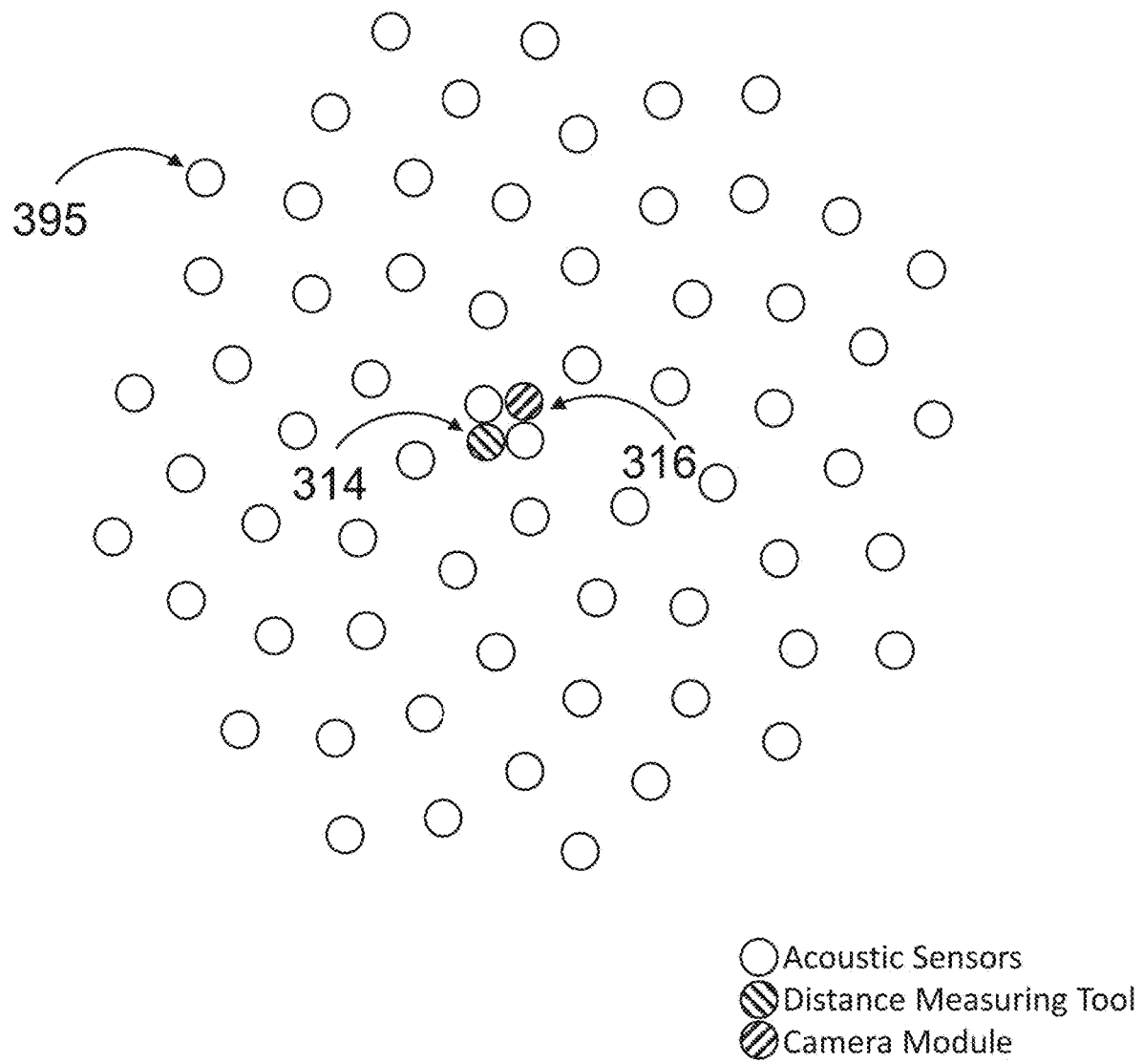

FIGS. 3A-3C provide exemplary acoustic sensor array configurations, however other acoustic sensor array configurations may be used. Acoustic sensor array configurations may comprise a variety of shapes and patterns, such as acoustic sensors arranged in a grid-like pattern, in concentric circles, in a sunflower array, in an ordered circular array, or the like. FIG. 3D provides an exemplary embodiment wherein acoustic sensors 395 are arranged in an ordered circular array configuration. The ordered circular array, such as shown in FIG. 3D, may provide various distances between the acoustic sensors rather than having a uniform distance between the them. Such a confirmation may help the acoustic sensor array discern a larger range of frequencies by using various portions of the acoustic sensor array. For example, the closer the acoustic sensors are to each other the better it may be at detecting higher frequencies; similarly, the farther the acoustic sensors are from each other the better it may be at detecting lower frequencies. Thus, having a variety of distances between acoustic sensors, some closer and some farther, may help provide better detection for a larger range of frequencies. Furthermore, the ordered circular array of FIG. 3D may provide differences in time of arrival versus the location of sound for different portions of the array and thus help with focusing the acoustic sensor array and/or determining where an acoustic signal is being emitted from. Additionally the ordered circular array may help resolve spatial aliasing and sidelobes which may be present.

Figure 4A:
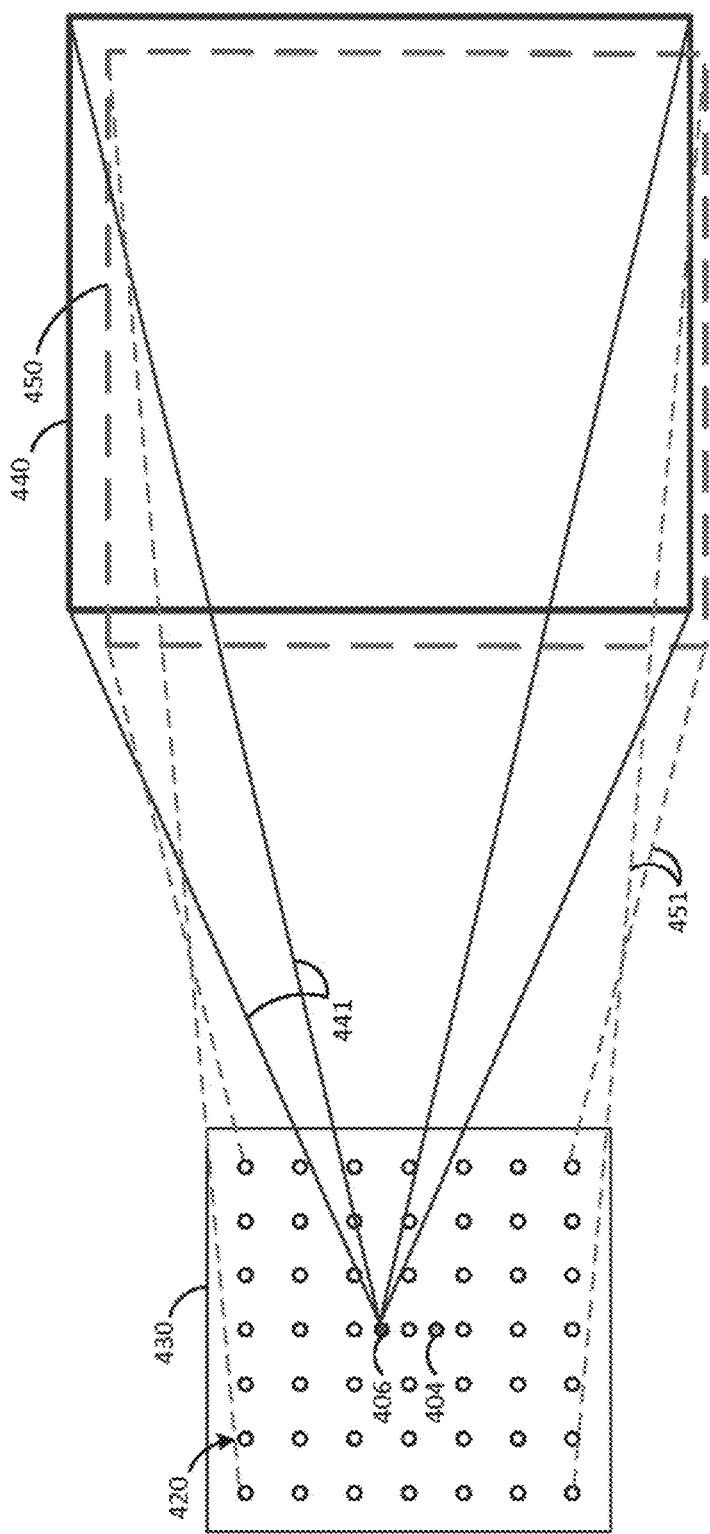
FIGS. 4A and 4B show schematic illustrations of parallax error in the generation of a frame of visible light image data and acoustic image data.

In some examples, general misalignment of an acoustic sensor array and an imaging tool, such as a camera module, can lead to misalignment in corresponding image data generated by the acoustic sensor array and the imaging tool. FIG. 4A shows a schematic illustration of parallax error in the generation of a frame of visible light image data and acoustic image data. In general, parallax error can be vertical, horizontal, or both. In the illustrated embodiment, an acoustic sensor array 420 and an imaging tool comprising a visible light camera module 406. Visible light image frame 440 is shown being captured according to the field of view 441 of the visible light camera module 406 while acoustic image frame 450 is shown as being captured according to the field of view 451 of the acoustic sensor array 420.

As shown, the visible light image frame 440 and the acoustic imaging frame 450 are not aligned with one another. In some embodiments, a processor (e.g., processor 212 of FIG. 2) is configured to manipulate one or both of the visible light image frame 440 and the acoustic image frame 450 in order to align visible light image data and acoustic image data. Such manipulation can include shifting one image frame relative to the other. The amount that the image frames are shifted relative to one another can be determined based on a variety of factors, including, for instance, the distance to the target from the visible light camera module 406 and/or the acoustic sensor array 420. Such distance data can be determined, for example, using distance measuring tool 404 or receiving a distance value via a user interface (e.g., 216).

Figure 4B:
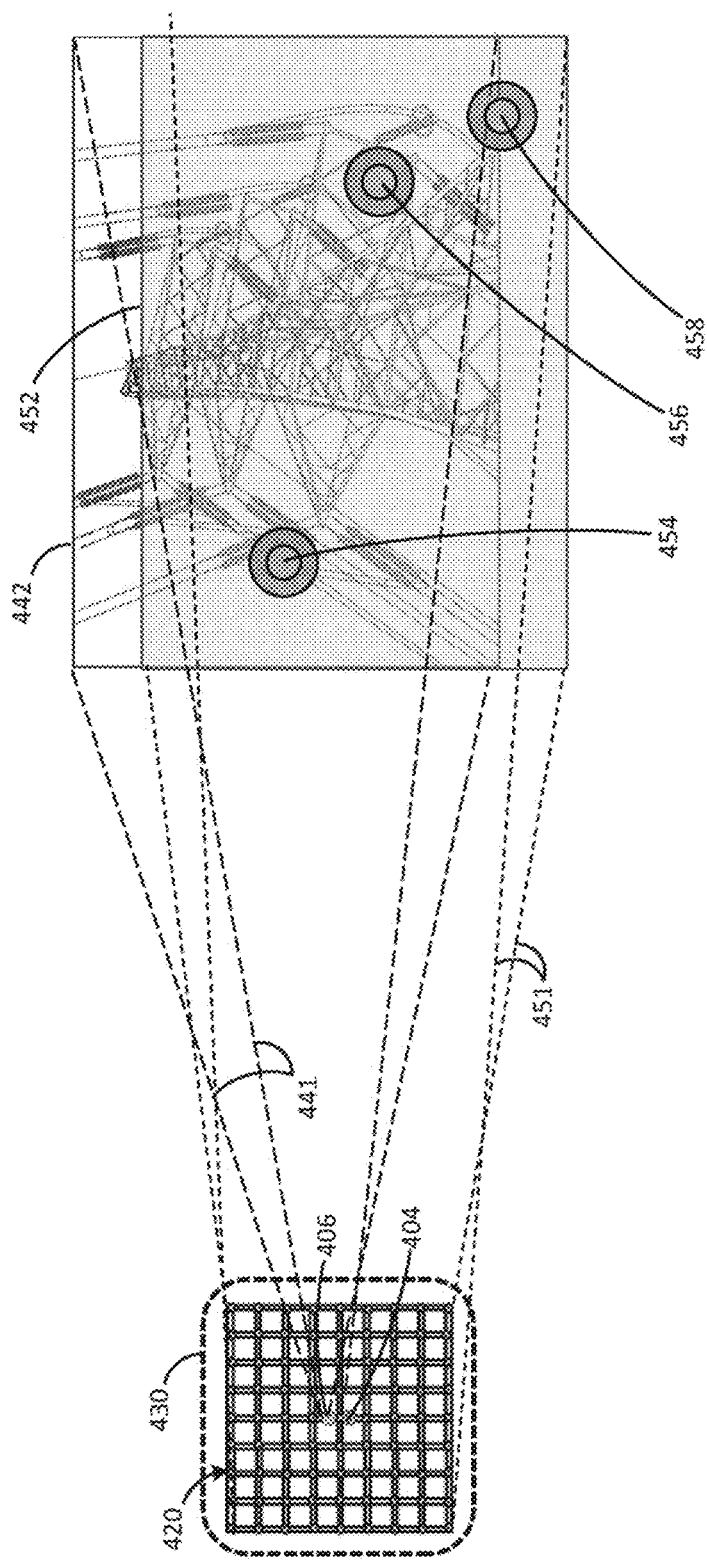

FIG. 4B is a schematic illustration similar to that in FIG. 4A, but including a visible light image of a scene. In the example of FIG. 4B, visible light image 442 shows a scene of a plurality of power lines and a supporting tower. The acoustic image 452 includes a plurality of locations 454, 456, 458 indicating high magnitude acoustic data coming from such locations. As shown, the visible light image 442 and the acoustic image 452 are both displayed simultaneously. However, observation of both images shows at least one acoustic image local maximum at location 458 that does not appear to coincide with any particular structure in the visible light image 442. Thus, one observing both images may conclude that there is misalignment (e.g., parallax error) between the acoustic image 452 and the visible light image 442.

Figure 5A:
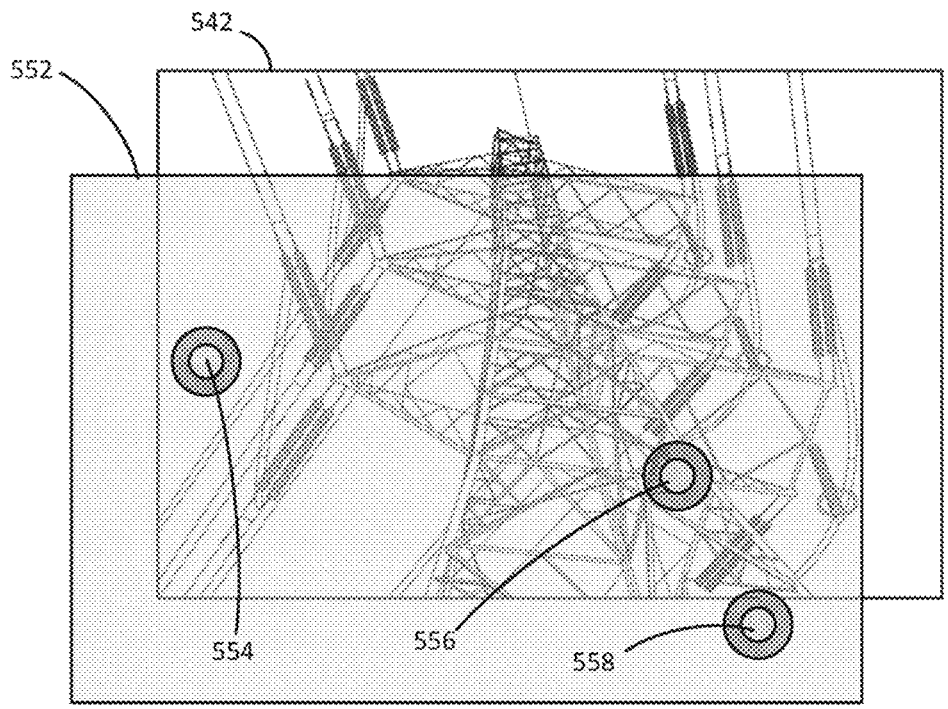
FIGS. 5A and 5B show parallax correction between a visible light image and an acoustic image.
Figure 5B:
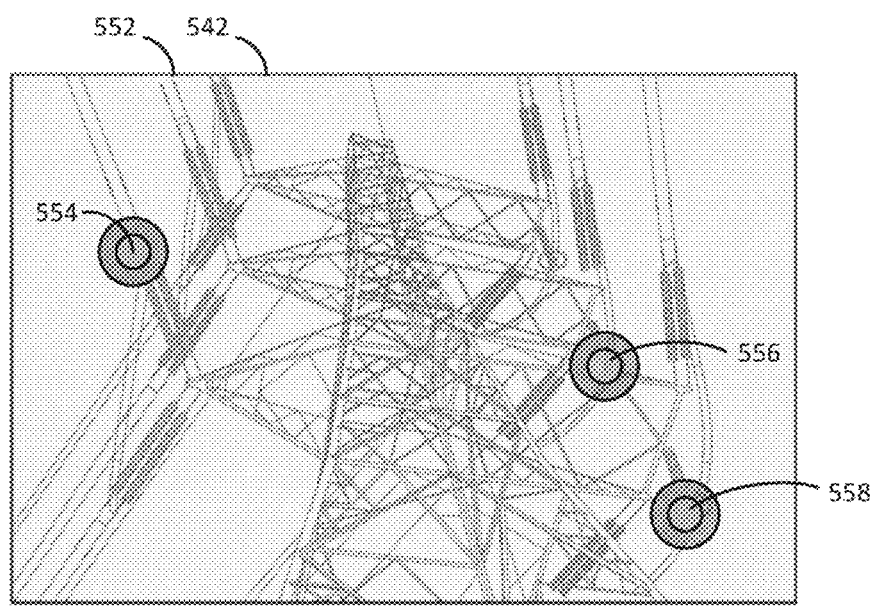

FIGS. 5A and 5B show parallax correction between a visible light image and an acoustic image. FIG. 5A, similar to FIG. 4B, shows a visible light image 542 and an acoustic image 552. The acoustic image 552 includes local maxima at locations 554, 556, and 558. As can be seen, maxima at locations 554 and 558 do not appear to coincide with any structure in the visible light image. In the example of FIG. 5B, the visible light image 542 and the acoustic image 552 are registered with respect to one another. The local maxima at locations 554, 556, and 558 in the acoustic image now appear to coincide with various locations within the visible light image 542.

During use, an operator may view the representation in FIG. 5B (e.g., via display 214) and determine approximate locations in the visible scene 542 that are likely sources of received acoustic signals. Such signals can be further processed in order to determine information regarding the acoustic signature of various components in the scene. In various embodiments, acoustic parameters such as frequency content, periodicity, amplitude, and the like can be analyzed with respect to various locations in the acoustic image. When overlaid onto visible light data so that such parameters can be associated with various system components, acoustic image data may be used to analyze various properties (e.g., performance characteristics) of objects in the visible light image.

As shown in FIGS. 5A and 5B, locations 554, 556, and 558 show a circular gradient. As described elsewhere herein, acoustic image data can be visually represented according to a palettization scheme in which each pixel of acoustic image data is colorized based on the acoustic intensity at a corresponding location. Thus, in the exemplary representations of FIGS. 5A and 5B, the circular gradient of locations 554, 556, 558 generally represents a gradient in acoustic intensity in the imaging plane based on back-propagated received acoustic signals.

It will be appreciated that, while the exemplary illustrations in FIGS. 4A, 4B, 5A, and 5B are described with respect to acoustic image data and visible light image data, such processes can be similarly performed with a variety of electromagnetic image data. For example, as described elsewhere herein, in various embodiments, various such processes can be performed using combinations of acoustic image data and one or more of visible light image data, infrared image data, ultraviolet image data, or the like.

As described elsewhere herein, in some embodiments, the back-propagation of acoustic signals to form an acoustic image can be based on a distance to target value. That is, in some examples, the back-propagation calculations can be based on a distance, and can include determining a two-dimensional acoustic scene located at that distance from the acoustic sensor array. Given a two-dimensional imaging plane, spherical sound waves emanating from a source in the plane would generally appear circular in cross-section, with a radial decay in intensity as shown in FIGS. 5A-5B.

In some such examples, portions of an acoustic scene representing data not located at the distance-to-target used in the back-propagation calculation will result in errors in the acoustic image data, such as inaccuracies in the location of one or more sounds in the scene. Such errors can, when the acoustic image is displayed simultaneously (e.g., blended, combined, etc.) with other image data (e.g., electromagnetic image data, such as visible light, infrared, or ultraviolet image data), lead to parallax errors between the acoustic image data and other image data. Thus, in some embodiments, some techniques for correcting parallax error (e.g., as shown in FIGS. 5A and 5B) comprise adjusting a distance-to-target value used in the back-propagation calculation for generating acoustic image data.

In some cases, the system can be configured to perform a back-propagation process using a first distance-to-target value and display a display image such as shown in FIG. 5A in which the acoustic image data and another data stream may not be aligned. Subsequently, the acoustic analysis system can adjust the distance-to-target value used for back-propagation, perform the back-propagation again, and update the display image with the new acoustic image data. This process can repeat, with the acoustic analysis system cycling through a plurality of distance-to-target values while a user observes the resulting display images on a display. As the distance-to-target value changes, the user may observe a gradual transition from the display image shown in FIG. 5A to the display image shown in FIG. 5B. In some such cases, a user may visually observe when the acoustic image data appears properly registered with another data stream, such as electromagnetic image data. A user may signal to the acoustic analysis system that the acoustic image data appears properly registered, indicating to the system that the distance-to-target value used to perform the most recent back-propagation is approximately correct, and can save that distance value to memory as the correct distance-to-target. Similarly, a user may manually adjust a distance-to-target value as the display image is updated using new distance values in updated back-propagation processes until the user observes that the acoustic image data is properly registered. The user may choose to save the current distance to target in the acoustic analysis system as a current distance-to-target.

In some examples, correcting a parallax error can include adjusting the position of the acoustic image data relative to other image data (e.g., electromagnetic image data) by a predetermined amount and in a predetermined direction based on the distance-to-target data. In some embodiments, such adjustments are independent of the generation of the acoustic image data by back-propagating acoustic signals to the identified distance-to-target.

In some embodiments, in addition to being used to generate acoustic image data and reduce parallax error between the acoustic image data and other image data, a distance-to-target value can be used for other determinations. For instance, in some examples, a processor (e.g., processor 212) can use a distance to target value in order to focus or assist a user in focusing an image, such as an infrared image, as described in U.S. Pat. No. 7,538,326, which is incorporated by reference. As described therein, this can similarly be used to correct for parallax errors between visible light image data and infrared image data. Thus, in some examples, a distance value can be used to register acoustic image data with electromagnetic imaging data, such as infrared image data and visible light image data.

As described elsewhere herein, in some examples, a distance measuring tool (e.g., distance measuring tool 204) is configured to provide distance information that can be used by the processor (e.g., processor 212) for generating and registering acoustic image data. In some embodiments, the distance measuring tool comprises a laser distance meter configured to emit light onto the target scene at a location to which the distance is measured. In some such examples, the laser distance meter can emit light in the visible spectrum so that the user may view the laser spot in the physical scene to ensure that the distance meter is measuring a distance to a desired portion of the scene. Additionally or alternatively, the laser distance meter is configured to emit light in a spectrum to which one or more imaging components (e.g., camera modules) is sensitive. Thus, a user viewing the target scene via the analysis tool (e.g., via display 214) may observe the laser spot in the scene to ensure that the laser is measuring the distance to the correct location in the target scene. In some examples, the processor (e.g., 212) can be configured to generate a reference mark in a displayed image representative of the location that the laser spot would be located in the acoustic scene based on a current distance value (e.g., based on a known distance-based parallax relationship between the laser distance meter and the acoustic sensor array). The reference mark location can be compared to a location of the actual laser mark (e.g., graphically on a display and/or physically in the target scene) and the scene can be adjusted until the reference mark and the laser coincide. Such processes can be performed similar to the infrared registration and focusing techniques described in U.S. Pat. No. 7,538,326, which is incorporated by reference.

Figure 6:
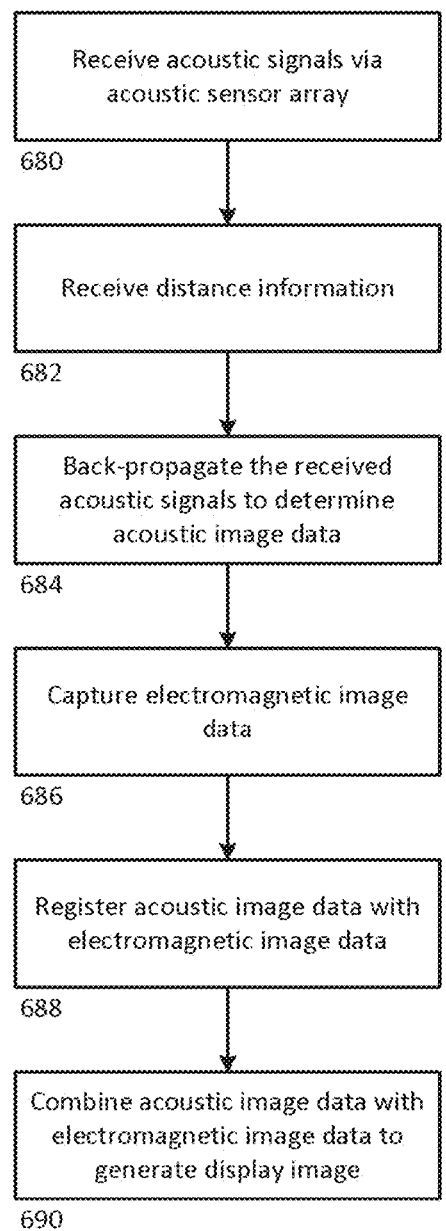
FIG. 6 is a process flow diagram showing an exemplary method for generating a final image combining acoustic image data and electromagnetic image data.

FIG. 6 is a process flow diagram showing an exemplary method for generating a final image combining acoustic image data and electromagnetic image data. The method includes the steps of receiving acoustic signals via an acoustic sensor array (680) and receiving distance information (682). Distance information can be received, for example, via a distance measuring device and/or a user interface, such as via manual entry or as the result of a distance adjustment process by which the distance is determined based on an observed registration.

The method further includes back-propagating the received acoustic signals to determine acoustic image data representative of the acoustic scene (684). As described elsewhere herein, back-propagating can be include analyzing a plurality of acoustic signals received at a plurality of sensor elements in an acoustic sensor array in combination with the received distance information to determine a source pattern of the received acoustic signals.

The method of FIG. 6 further includes the step of capturing electromagnetic image data (686), and registering the acoustic image data with the electromagnetic image data (688). In some embodiments, registering the acoustic image data with the electromagnetic image data is done as part of the back-propagation step for generating the acoustic image data (684). In other examples, registering the acoustic image data with the electromagnetic image data is done separately from the generation of the acoustic image data.

The method of FIG. 6 includes the step of combining acoustic image data with electromagnetic image data in order to generate a display image (690). As described elsewhere herein, combining electromagnetic image data and acoustic image data can comprise alpha blending the electromagnetic image data and the acoustic image data. Combining the image data can include overlaying one image data set onto the other, such as in a picture-in-picture mode or in locations in which certain conditions (e.g., alarm conditions) are satisfied. The display image can be presented to a user, for example, via a display that is supported by a housing that supports the acoustic sensor array and/or via a display separate from the sensor array, such as the display of an external device (e.g., a smartphone, tablet, computer, etc.).

Additionally or alternatively, the display image can be saved in a local (e.g., on-board) memory and/or a remote memory for future viewing. In some embodiments, the saved display image can include metadata that allows for future adjustment of the display image properties, such as blending ratios, back-propagation distance, or other parameters used to generate the image. In some examples, raw acoustic signal data and/or electromagnetic image data can be saved with the display image for subsequent processing or analysis.

While shown as a method for generating a final image combining acoustic image data and electromagnetic image data, it will be appreciated that the method of FIG. 6 could be used to combine acoustic image data with one or more sets of image data spanning any portion of the electromagnetic spectrum, such as visible light image data, infrared image data, ultraviolet image data, and the like. In some such examples, multiple sets of image data, such as visible light image data and infrared image data, can be both combined with acoustic image data to generate a display image via methods similar to that described with respect to FIG. 6.

In some examples, receiving acoustic signals via a sensor array (680) can include a step of selecting an acoustic sensor array with which to receive acoustic signals. As described, for example, with respect to FIGS. 3A-C, acoustic analysis systems can include a plurality of acoustic sensor arrays that can be suited for analyzing acoustic signals of varying frequencies. Additionally or alternatively, in some examples, different acoustic sensor arrays can be useful for analyzing acoustic signals propagating from different distances. In some embodiments, different arrays can be nested inside one another. Additionally or alternatively, partial arrays can be selectively used to receive acoustic image signals.

For example, FIG. 3A shows first array 320 and a second array 322 nested within the first array. In an exemplary embodiment, the first array 320 can include a sensor array configured (e.g., spaced) for receiving acoustic signals and generating acoustic image data for frequencies in a first frequency range. Second array 322 can include, for example, a second sensor array configured to be used alone or in combination with all or part of the first array 320 for generating acoustic image data for frequencies in a second frequency range.

Similarly, FIG. 3C shows a first array 392, a second array 394 at least partially nested within the first array 392, and a third array 396 at least partially nested within the first array 392 and the second array 394. In some embodiments, the first array 392 can be configured for receiving acoustic signals and generating acoustic image data for frequencies in a first frequency range. The second array 394 can be used with all or part of the first array 392 for receiving acoustic signals and generating acoustic image data for frequencies in a second frequency range. The third array 396 can be used alone, with all or part of the second array 394, and/or with all or part of the first array 392 for receiving acoustic signals and generating acoustic image data for frequencies in a third frequency range.

In some embodiments, in a nested array configuration, acoustic sensor elements from one array may be positioned between the acoustic sensor elements, such as elements of third array 396 being generally between elements of first array 392. In some such examples, the acoustic sensor elements in a nested array (e.g., third array 396) may be positioned in the same plane as, in front of, or behind the acoustic sensor elements in the array into which it is nested (e.g., first array 392).

In various implementations, arrays used for sensing higher frequency acoustic signals generally require less distance between individual sensors. Thus, with respect to FIG. 3C, for instance, third array 396 may be better suited for performing acoustic imaging processes involving higher frequency acoustic signals. Other sensor arrays (e.g., first array 392) may be sufficient for performing acoustic imaging processes involving lower frequency signals, and may be used in order to reduce the computational demand of processing signals from a smaller number of acoustic sensor elements when compared to array 396. Thus, in some examples, high-frequency sensor arrays may be nested within low-frequency sensor arrays. As described elsewhere herein, such arrays may generally be operated individually (e.g., via switching between active arrays) or together.

In addition or alternatively to selecting an appropriate sensor array based on an expected/desired frequency spectrum for analysis, in some examples, different sensor arrays may be better suited for performing acoustic imaging processes at difference distances to the target scene. For example, in some embodiments, if the distance between an acoustic sensor array and a target scene is small, outer sensor elements in the acoustic sensor array may receive significantly less useful acoustic information from the target scene than sensor elements more centrally located.

On the other hand, if the distance between an acoustic sensor array and a target scene is large, closely spaced acoustic sensor elements may not provide separately useful information. That is, if first and second acoustic sensor elements are close together, and the target scene is generally far away, the second acoustic sensor element may not provide any information that is meaningfully different from the first. Thus, data streams from such first and second sensor elements may be redundant and unnecessarily consume processing time and resources for analysis.

In addition to impacting which sensor arrays may be best suited for performing acoustic imaging, as described elsewhere herein, the distance to target may also be used in performing the back-propagating for determining acoustic image data from received acoustic signals. However, in addition to being an input value into a back-propagation algorithm, the distance-to-target may be used to select an appropriate back-propagation algorithm to use. For instance, in some examples, at far distances, spherically-propagating sound waves may be approximated as being substantially planar compared to the size of an acoustic sensor array. Thus, in some embodiments, when the distance-to-target is large, back-propagation of received acoustic signals can include an acoustic beamforming calculation. However, when closer to the source of the sound waves, a planar approximation of the sound wave may not be appropriate. Thus, different back-propagation algorithms may be used, such as near-field acoustic holography.

Figure 7:
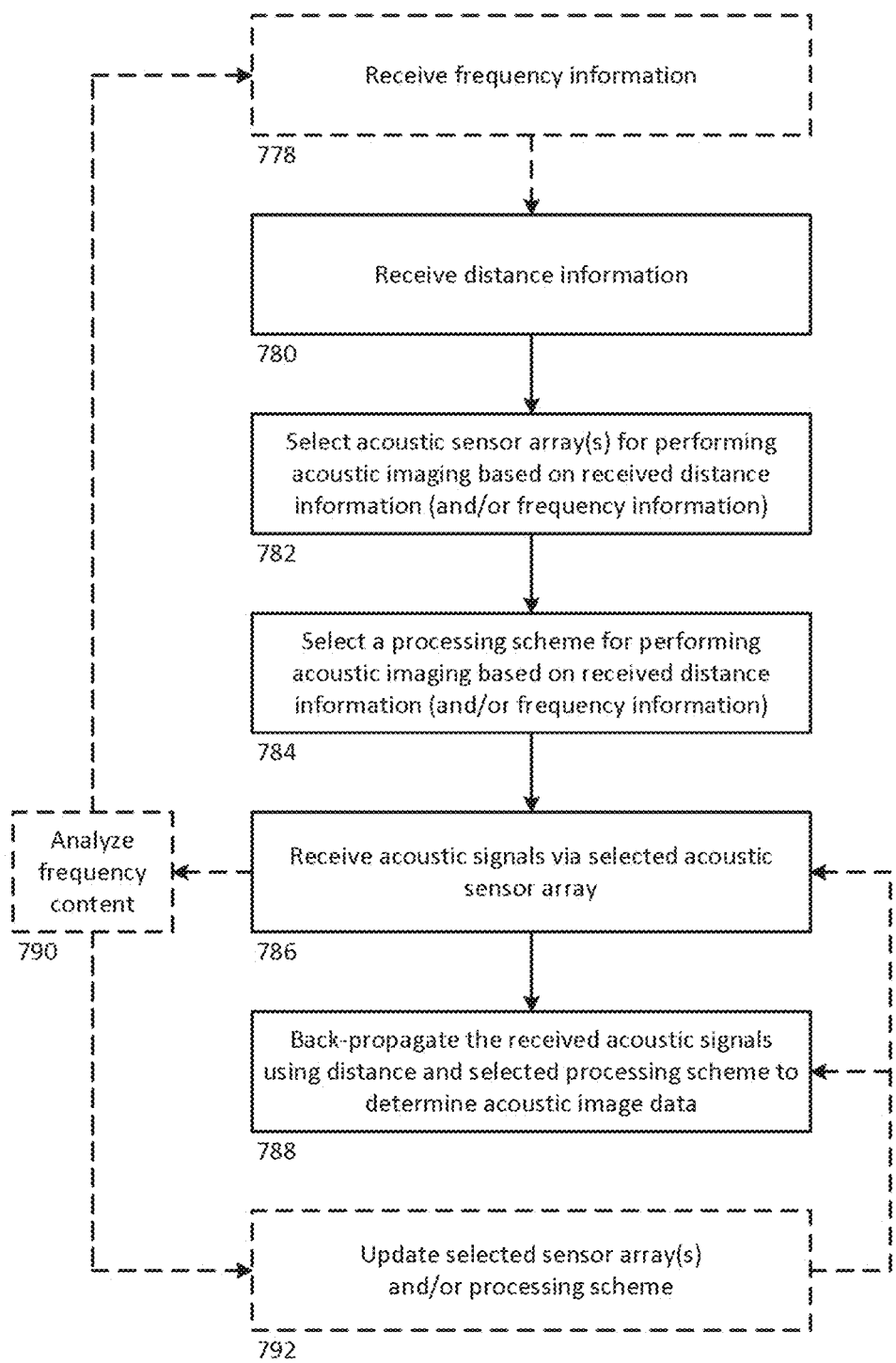
FIG. 7 is a process-flow diagram showing an exemplary process for generating acoustic image data from received acoustic signals.

As described, a distance-to-target metric can be used in a variety of ways in an acoustic imaging process, such as determining active sensor array(s), determining a back-propagation algorithm, performing the back-propagation algorithm, and/or registering a resulting acoustic image with electromagnetic image data (e.g., visible light, infrared, etc.). FIG. 7 is a process-flow diagram showing an exemplary process for generating acoustic image data from received acoustic signals.

The process of FIG. 7 includes receiving distance information (780), for example, from a distance measuring device or entered distance information, such as via a user interface. The method further includes the step of selecting one or more acoustic sensor array(s) for performing acoustic imaging based on the received distance information (782). As described, in various examples, selected array(s) can include a single array, a combination of multiple arrays, or portions of one or more arrays.

The method of FIG. 7 further includes the step of selecting a processing scheme for performing acoustic imaging based on the received distance information (784). In some examples, selecting a processing scheme can include selecting a back-propagation algorithm for generating acoustic image data from acoustic signals.

After selecting an acoustic sensor array (782) and processing scheme (784) for performing acoustic imaging, the method includes the steps of receiving acoustic signals via the selected acoustic sensor array (786). The received acoustic signals are then back-propagated using the distance and the selected processing scheme to determine acoustic image data (788).

In various embodiments, steps of FIG. 7 can be performed by a user, an acoustic analysis system (e.g., via processor 212), or a combination thereof. For example, in some embodiments, a processor can be configured to receive distance information (780) via a distance measuring tool and/or a user input. In some examples, a user can input a value to override a measured distance to use as the distance information, for instance, if the distance to an object is known and/or is difficult to analyze via the distance measuring tool (e.g., small object size and/or large distance to target, etc.). The processor can be further configured to automatically select an appropriate acoustic sensor array for performing acoustic imaging based on the received distance information, for example, using a lookup table or other database. In some embodiments, selecting an acoustic sensor array comprises enabling and/or disabling one or more acoustic sensor elements in order to achieve a desired acoustic sensor array.

Similarly, in some examples, the processor can be configured to automatically select a processing scheme (e.g., back-propagation algorithm) for performing acoustic imaging based on the received distance information. In some such examples, this can include selecting one from a plurality of known processing schemes stored in memory. Additionally or alternatively, selecting a processing scheme may amount to adjusting portions of a single algorithm to arrive at a desired processing scheme. For example, in some embodiments, a single back-propagation algorithm may include a plurality of terms and variable (e.g., based on distance information). In some such examples, selecting a processing scheme (784) can include defining one or more values in the single algorithm, such as adjusting coefficients for one or more terms (e.g., setting various coefficients to zero or one, etc.).

Thus, in some embodiments, an acoustic imaging system can automate several steps of an acoustic imaging process by suggesting and/or automatically implementing a selected acoustic sensor array and/or a processing scheme (e.g., a back-propagation algorithm) based on received distance data. This can speed up, improve, and simplify acoustic imaging processes, eliminating the requirements of an acoustic imaging expert to carry out an acoustic imaging process. Thus, in various examples, the acoustic imaging system can automatically implement such parameters, notify the user that such parameters are about to implemented, ask a user for permission to implement such parameters, suggest such parameters for manual input by a user, or the like.

Automatic selection and/or suggestion of such parameters (e.g., processing scheme, sensor array) can be useful to optimize localization of the acoustic image data with respect to other forms of image data, processing speed, and analysis of the acoustic image data. For instance, as described elsewhere herein, accurate back-propagation determination (e.g., using a proper algorithm and/or an accurate distance metric) can reduce parallax errors between acoustic image data and other (e.g., electromagnetic, such as visible light, infrared, etc.) image data. Additionally, utilizing proper algorithms and/or sensor arrays such as may be automatically selected or suggested by an acoustic analysis system can optimize the accuracy of the thermal image data, allowing for analysis of the received acoustic data.

Figure 8:
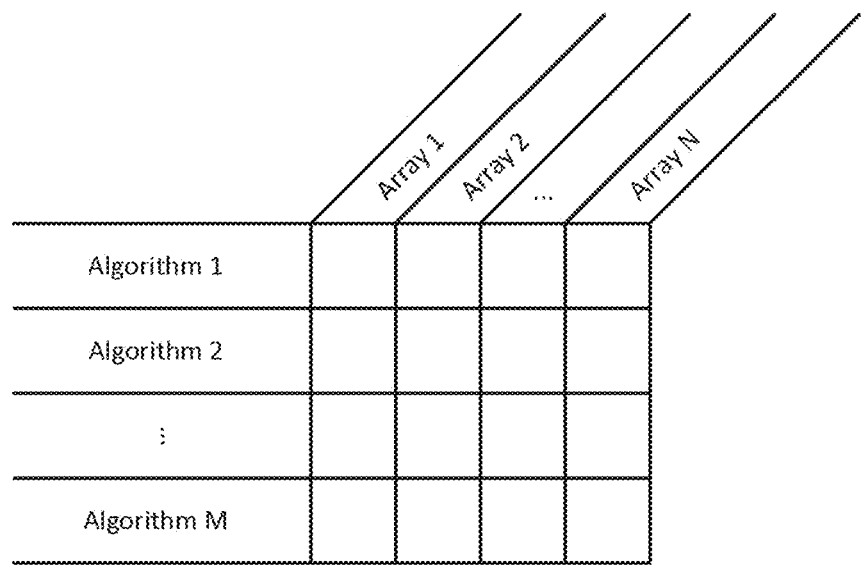
FIG. 8 shows an exemplary lookup table for determining an appropriate algorithm and sensor array for use during an acoustic imaging process.

As described, in some examples, an acoustic analysis system can be configured to automatically select an algorithm and/or a sensor array for performing acoustic imaging processes based on received distance information. In some such embodiments, a system includes a lookup table, for example, stored in memory, for determining which of a plurality of back-propagation algorithms and acoustic sensor arrays to use for determining acoustic image data. FIG. 8 shows an exemplary lookup table for determining an appropriate algorithm and sensor array for use during an acoustic imaging process.

In the illustrated example, the lookup table of FIG. 8 includes N columns, each representing different arrays: Array 1, Array 2, ..., Array N. In various examples, each array comprises a unique set of acoustic sensor elements arranged. Different arrays may comprise sensor elements arranged into a lattice (e.g., array 392 and array 396 in FIG. 3C). Arrays within the lookup table can also include combinations of sensor elements from one or more such lattices. In general, in some embodiments, each of arrays Array 1, Array 2, ..., Array N corresponds to a unique combination of acoustic sensor elements. Some of such combinations can include an entire set of sensor elements arranged in a particular lattice, or can include a subset of sensor elements arranged in a particular lattice. Any of a variety of combinations of acoustic sensor elements are possible options for use as a sensor array in the lookup table.

The lookup table of FIG. 8 further includes M rows, each representing a different algorithm: Algorithm 1, Algorithm 2, ..., Algorithm M. In some examples, different algorithms may include different processes for performing back-propagation analysis of received acoustic signals. As described elsewhere herein, in some examples, some different algorithms can be similar to one another while having different coefficients and/or terms for modifying the back-propagation results.

The exemplary lookup table of FIG. 8 includes M×N entries. In some embodiments, the acoustic analysis system utilizing such a lookup table is configured to analyze received distance information and classify the distance information into one of M×N bins, wherein each bin corresponds to an entry in the lookup table of FIG. 8. In such examples, when the acoustic analysis system receives distance information, the system can find the entry (i, j) in the lookup table corresponding to the bin in which the distance information lies, and determine the appropriate algorithm and sensor array for use during an acoustic imaging process. For example, if the received distance information corresponds to the bin associated with entry (i, j), the acoustic analysis system can automatically utilize or suggest using Algorithm i and Array j for an acoustic imaging process.

In various such examples, distance information bins can correspond to uniformly sized distance ranges, for example, a first bin corresponding to distances of within one foot, a second bin corresponding to distances between one and two feet, and so on. In other examples, bins need not correspond to uniformly sized distance spans. Additionally, in some embodiments, fewer than M×N bins can be used. For example, in some embodiments, there may be an algorithm (e.g., Algorithm x) that is not ever used with a particular array (e.g., Array y). Thus, in such an example, there would be no corresponding distance information bin corresponding to entry (x, y) in the M×N lookup table.

In some embodiments, statistical analysis on the populated distance bins can be used for identifying a most common distance or distance range within the target scene. In some such embodiments, the distance bin having the highest number of corresponding locations (e.g., a highest number of locations with acoustic signals) can be used as distance information in the process of FIG. 7. That is, in some embodiments, a utilized acoustic sensor array and/or processing scheme may be implemented and/or recommended based on statistical analysis of the distance distribution of various objects in the target scene. This can increase the likelihood that sensor array and/or processing scheme used for acoustic imaging of a scene is appropriate for the largest number of locations within the acoustic scene.

Additionally or alternatively, parameters other than distance information can be used to select appropriate sensor arrays and/or processing schemes to use in generating acoustic image data. As described elsewhere herein, various sensor arrays can be configured to be sensitive to certain frequencies and/or frequency bands. In some examples, different back-propagation calculations similar can be used according to different acoustic signal frequency content. Thus, in some examples, one or more parameters can be used to determine a processing scheme and/or acoustic sensor array.

In some embodiments, the acoustic analysis system can be used to initially analyze various parameters of received acoustic signals processing/analysis. With reference back to FIG. 7, a method for generating acoustic image data can include a step of, after receiving acoustic signals (786), analyzing frequency content of the received signals (790). In some such examples, if the acoustic sensor array(s) and/or processing schemes have been selected (e.g., via steps 782 and/or 784, respectively), the method can include the steps of updating the selected array(s) and/or updating the selected processing scheme (792), for example, based on the analyzed frequency content.

After updating the sensor array(s) and/or processing scheme, the method can perform various actions using the updated parameters. For example, if the selected sensor array(s) is updated (792) based on analyzed frequency content (790), then new acoustic signals can be received from the (newly) selected acoustic sensor array (786), which can then be back-propagated to determine acoustic image data (788). Alternatively, if the processing scheme is updated at 792, already-captured acoustic signals can be back-propagated according to the updated processing scheme to determine updated acoustic image data. If both the processing scheme and the sensor array(s) are updated, new acoustic signals can be received using the updated sensor array and can be back-propagated according to the updated processing scheme.

In some embodiments, an acoustic analysis system can receive frequency information (778) without analyzing frequency content of received acoustic signals (790). For instance, in some examples, an acoustic analysis system can receive information regarding a desired or expected frequency range for future acoustic analysis. In some such examples, the desired or expected frequency information can be used to select one or more sensor arrays and/or a processing scheme that best fits the frequency information. In some such examples, the step(s) of selecting acoustic sensor array(s) (782) and/or selecting a processing scheme (784) can be based on received frequency information in addition or alternatively to received distance information.

In some examples, received acoustic signals (e.g., received via the acoustic sensor elements) can be analyzed, for example, via a processor (e.g., 210) of an acoustic analysis system. Such analysis can be used to determine one or more properties of the acoustic signals, such as frequency, intensity, periodicity, apparent proximity (e.g., a distance estimated based on received acoustic signals), measured proximity, or any combinations thereof. In some examples, acoustic image data can be filtered, for instance, to only show acoustic image data representing acoustic signals having a particular frequency content, periodicity, or the like. In some examples, any number of such filters can be applied simultaneously.

As described elsewhere herein, in some embodiments, a series of frames of acoustic image data can be captured over time, similar to acoustic video data. Additionally or alternatively, even if acoustic image data is not repeatedly generated, in some examples, acoustic signals are repeatedly sampled and analyzed. Thus, with or without repeated acoustic image data generation (e.g., video), parameters of acoustic data, such as frequency, can be monitored over time.

Figure 9A:
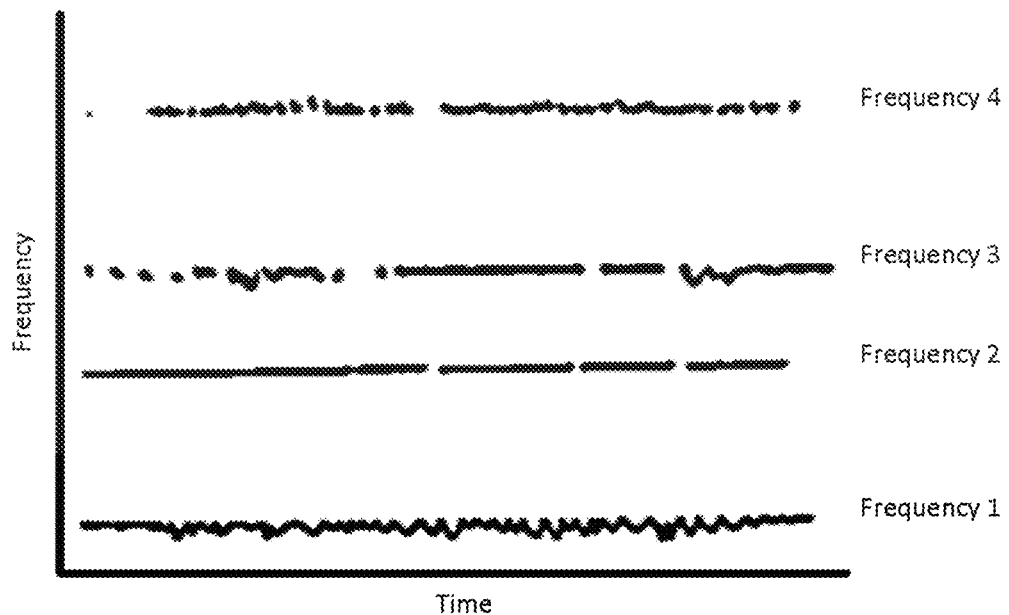
FIG. 9A is an exemplary plot of frequency content of received image data over time in an acoustic scene.

FIG. 9A is an exemplary plot of frequency content of received image data over time in an acoustic scene. As shown, the acoustic scene represented by the plot of FIG. 9A generally includes four sustained frequencies over time, labeled as Frequency 1, Frequency 2, Frequency 3, and Frequency 4. Frequency data, such as the frequency content of a target scene, can be determined via processing received acoustic signals, for example, using a Fast Fourier Transform (FFT) or other known method of frequency analysis.

Figure 9B:
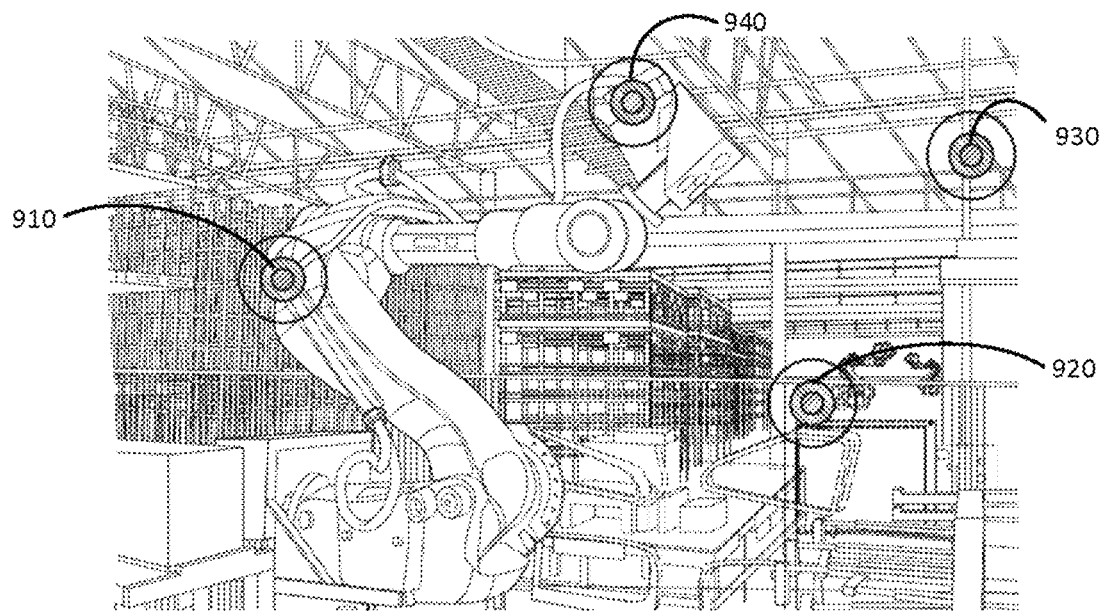
FIG. 9B shows an exemplary scene including a plurality of locations emitting acoustic signals.

FIG. 9B shows an exemplary scene including a plurality of locations emitting acoustic signals. In the illustrated image, acoustic image data is combined with visible light image data, and shows acoustic signals present at locations 910, 920, 930, and 940. In some embodiments, acoustic analysis system is configured to display acoustic image data of any detected frequency range. For instance, in an exemplary embodiment, location 910 includes acoustic image data including Frequency 1, location 920 includes acoustic image data including Frequency 2, location 930 includes acoustic image data including Frequency 3, and location 940 includes acoustic image data including Frequency 4.

In some such examples, displaying acoustic image data representative frequency ranges is a selectable mode of operation. Similarly, in some embodiments, acoustic analysis system is configured to display acoustic image data representative of frequencies only within a predetermined frequency band. In some such examples, displaying acoustic image data representing a predetermined frequency range comprises selecting one or more acoustic sensor arrays for receiving acoustic signals from which to generate acoustic image data. Such arrays can be configured to receive a selective frequency range. Similarly, in some examples, one or more filters can be employed to limit the frequency content used to generate the acoustic image data. Additionally or alternatively, in some embodiments, acoustic image data comprising information representative of a broad range of frequencies can be analyzed and shown on the display only if the acoustic image data satisfies a predetermined condition (e.g., falls within a predetermined frequency range).

Figure 9C:
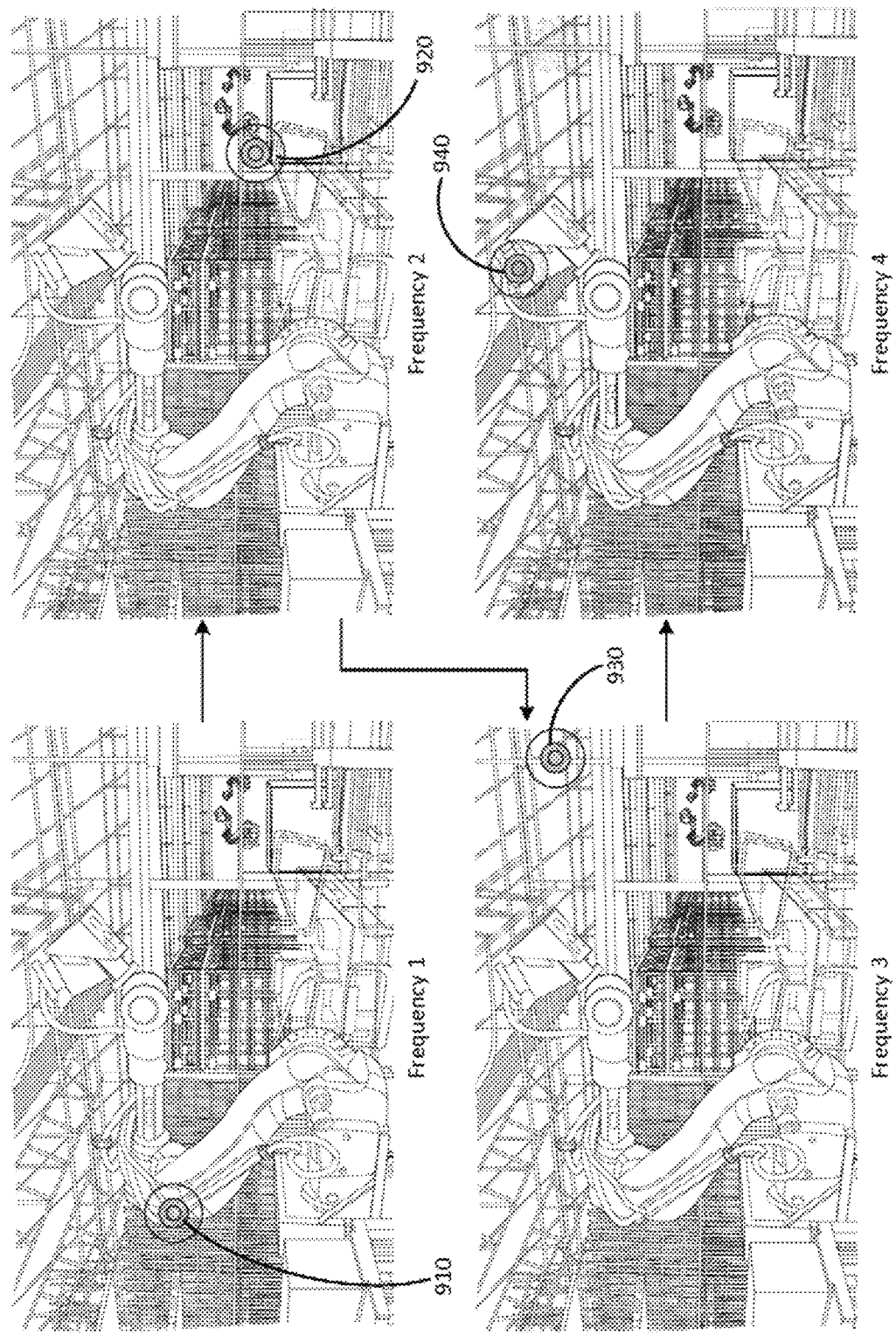
FIG. 9C shows a plurality of combined acoustic and visible light image data at a plurality of predefined frequency ranges.

FIG. 9C shows a plurality of combined acoustic and visible light image data at a plurality of predefined frequency ranges. A first image includes acoustic image data at a first location 910 that includes frequency content of Frequency 1. A second image includes acoustic image data at a second location 920 that includes frequency content of Frequency 2. A third image includes acoustic image data at a third location 930 that includes frequency content of Frequency 3. A fourth image includes acoustic image data at a fourth location 940 that includes frequency content of Frequency 4.

In an exemplary embodiment, a user may select various frequency ranges, such as ranges including Frequency 1, Frequency 2, Frequency 3, or Frequency 4, for filtering acoustic image data representative of frequency content other than the selected frequency range. Thus, in such examples, any of the first, second, third, or fourth images may be displayed as a result of a desired frequency range being selected by a user.

Additionally or alternatively, in some examples, an acoustic analysis system may cycle between a plurality of display images, each having different frequency content. For instance, with respect to FIG. 9C, in an exemplary embodiment, an acoustic analysis system may display, in a sequence, the first, second, third, and fourth images, such as shown by the arrows in FIG. 9C.

In some examples, display images can include a text or other display representative of the frequency content being displayed in the image so that a user may observe which locations in the image include acoustic image data representative of certain frequency content. For example, with respect to FIG. 9C, each image may show a textual representation of the frequency represented in the acoustic image data. With respect to FIG. 9B, an image showing a plurality of frequency ranges may include indications of the frequency content at each location including acoustic image data. In some such examples, a user may select a location in the image, for example, via a user interface, for which to view the frequency content present at that location in the acoustic scene. For example, a user may select first location 910, and the acoustic analysis system may present the frequency content of the first location (e.g., Frequency 1). Thus, in various examples, a user can use the acoustic analysis system in order to analyze the frequency content of an acoustic scene, such as by viewing where in the scene corresponds to certain frequency content and/or by viewing what frequency content is present at various locations.

During exemplary acoustic imaging operation, filtering acoustic image data by frequency can help reduce image clutter, for example, from background or other unimportant sounds. In an exemplary acoustic imaging procedure, a user may wish to eliminate background sounds, such as floor noise in an industrial setting. In some such instances, background noise can include mostly low frequency noise. Thus, a user may choose to show acoustic image data representative of acoustic signals greater than a predetermined frequency (e.g., 10 kHz). In another example, a user may wish to analyze a particular object that generally emits acoustic signals within a certain range, such as corona discharge from a transmission line (e.g., as shown in FIGS. 5A and 5B). In such an example, a user may select a particular frequency range (e.g., between 11 kHz and 14 kHz for corona discharge) for acoustic imaging.

In some examples, an acoustic analysis system can be used to analyze and/or present information associated with the intensity of received acoustic signals. For example, in some embodiments, back-propagating received acoustic signals can include determining an acoustic intensity value at a plurality of locations in the acoustic scene. In some examples, similar to frequency described above, acoustic image data is only included in a display image if the intensity of the acoustic signals meets one or more predetermined requirements.

In various such embodiments, a display image can include acoustic image data representative of acoustic signals above a predetermined threshold (e.g., 15 dB), acoustic signals below a predetermined threshold (e.g., 100 dB), or acoustic signals within a predetermined intensity range (e.g., between 15 dB and 40 dB). In some embodiments, a threshold value can be based on a statistical analysis of the acoustic scene, such as above or below a standard deviation from the mean acoustic intensity.

Similar to as described above with respect to frequency information, in some embodiments, restricting acoustic image data to represent acoustic signals satisfying one or more intensity requirements can include filtering received acoustic signals so that only received signals that satisfy the predetermined conditions are used to generate acoustic image data. In other examples, acoustic image data is filtered to adjust which acoustic image data is displayed.

Additionally or alternatively, in some embodiments, acoustic intensity at locations within an acoustic scene can be monitored over time (e.g., in conjunction with a video acoustic image representation or via background analysis without necessarily updating a display image). In some such examples, predetermined requirements for displaying acoustic image data can include an amount or rate of change in acoustic intensity at a location in an image.

Figure 10A:
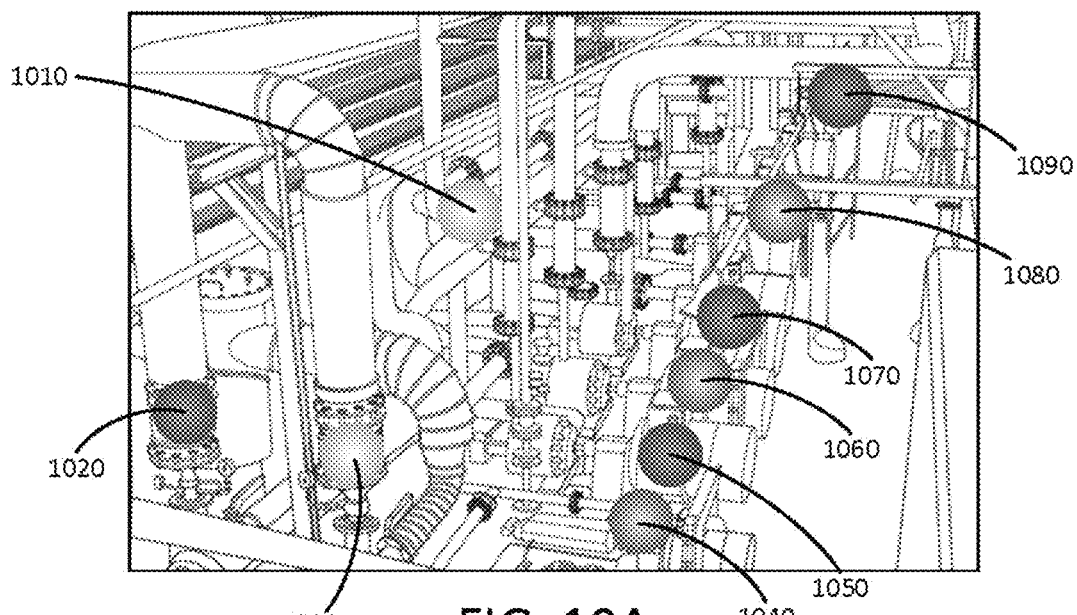
FIGS. 10A and 10B are exemplary display images including combined visible light image data and acoustic image data.
Figure 10B:
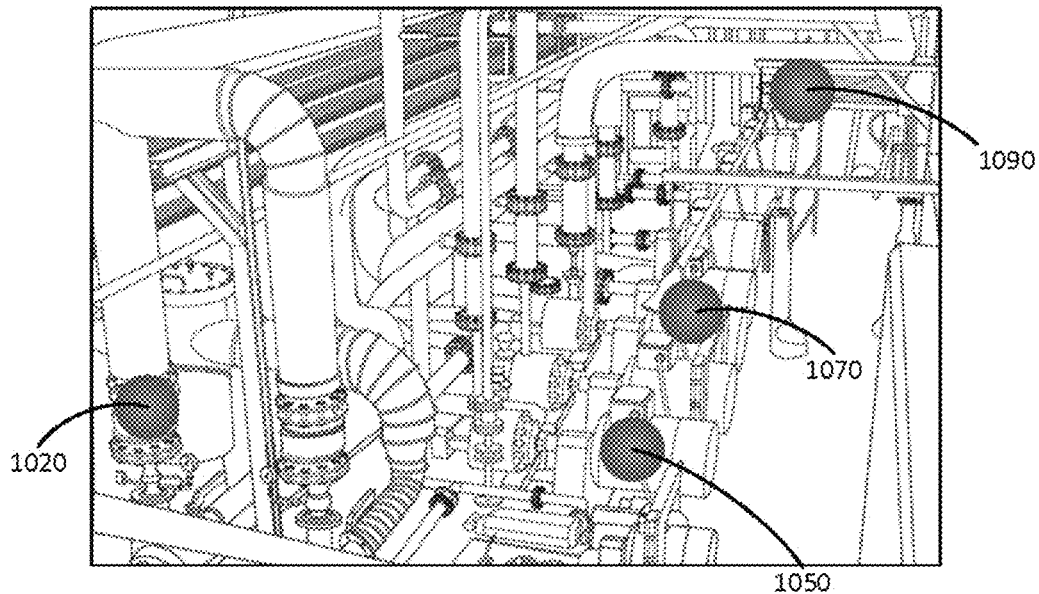

FIGS. 10A and 10B are exemplary display images including combined visible light image data and acoustic image data. FIG. 10A shows a display image including acoustic image data shown at a plurality of locations 1010, 1020, 1030, 1040, 1050, 1060, 1070, 1080, and 1090. In some examples, intensity values can be palletized, for example, wherein an acoustic intensity value is assigned a color based on a predetermined palettization scheme. In an exemplary embodiment, intensity values can be categorized according to intensity ranges (e.g., 10 dB-20 dB, 20 dB-30 dB, etc.). Each intensity range can be associated with a particular color according to a palettization scheme. Acoustic image data can include a plurality of pixels, wherein each pixel is colorized in the color associated with the intensity range into which the intensity represented by the pixel of acoustic image data falls. In addition or alternatively to being differentiated by color, different intensities can be distinguished according to other properties, such as transparency (e.g., in an image overlay in which acoustic image data is overlaid onto other image data) or the like.

Additional parameters may also be palletized, such as a rate of change of acoustic intensity. Similar to intensity, varying rates of change in acoustic intensity can be palletized such that portions of the scenes exhibiting different rates and/or amounts of acoustic intensity change are displayed in different colors.

In the illustrated example, the acoustic image data is palletized according to an intensity palette, such that acoustic image data representative of different acoustic signal intensities are shown in a different color and/or shade. For instance, acoustic image data at locations 1010 and 1030 show a palletized representation of a first intensity, locations 1040, 1060, and 1080 show a palletized representation of a second intensity, and locations 1020, 1050, 1070, and 1090 show a palletized representation of a third intensity. As shown in the exemplary representation in FIG. 10A, each location showing a palletized representation of acoustic image data shows circular pattern having a color gradient extending outward from the center. This can be due to the decay of acoustic intensity as the signals propagate from a source of the acoustic signals.

In the example of FIG. 10A, acoustic image data is combined with visible light image data to generate a display image, which may be presented to a user, for example, via a display. A user may view the display image of FIG. 10A in order to view which locations in a visible scene are producing acoustic signals, and the intensities of such signals. Thus, a user may quickly and easily observe which locations are producing sounds and compare the intensities of the sounds coming from various locations in the scene.

Similar to as described with respect to frequencies elsewhere herein, in some embodiments, acoustic image data may be presented only if the corresponding acoustic signals meet a predetermined intensity condition. FIG. 10B shows an exemplary display image similar to the display image of FIG. 10A and including visible light image data and acoustic image representing acoustic signals above a predetermined threshold. As shown, of locations 1010, 1020, 1030, 1040, 1050, 1060, 1070, 1080, and 1090 in FIG. 10A that include acoustic image data, only locations 1020, 1050, 1070, and 1090 include acoustic image data representing acoustic signals that meet a predetermined condition.

In an exemplary scenario, FIG. 10A can include all acoustic image data above a noise floor threshold at each of locations 1010-990, while FIG. 10B shows the same scene as FIG. 10A, but only showing acoustic image data having an intensity greater than 40 dB. This can help a user identify which sources of sound in an environment (e.g., in the target scene of FIGS. 10A and 10B) are contributing certain sounds (e.g., the loudest sounds in a scene).

In addition or alternatively to being compared directly to an intensity threshold (e.g., 40 dB), as described elsewhere herein, in some examples, predetermined requirements for displaying acoustic image data can include an amount or rate of change in acoustic intensity at a location in an image. In some such examples, acoustic image data may be presented only if a rate of change or an amount of change in acoustic intensity at a given location satisfies a predetermined condition (e.g., is greater than a threshold, less than a threshold, within a predetermined range, etc.). In some embodiments, amount or rate of change of acoustic intensity can be palletized and displayed as or in conjunction with intensity acoustic image data. For instance, in an exemplary embodiment, when a rate of change is used as a threshold to determine in which locations to include acoustic image data, the acoustic image data can include a palletized intensity rate of change metric for display.

In some examples, a user may manually set an intensity requirement (e.g., minimum value, maximum value, range, rate of change, amount of change, etc.) for the acoustic image data to be displayed. As discussed elsewhere herein, including acoustic image data that only meets the intensity requirement can be achieved during acoustic image data generation (e.g., via filtering received acoustic signals) and/or can be performed by not displaying generated acoustic image data representing acoustic signals that do not meet the set requirement(s). In some such examples, filtering a display image according to intensity values can be performed after the acoustic image data and visible light image data have been captured and stored in memory. That is, data stored in memory can be used to generate display images including any number of filtering parameters, such as only showing acoustic image data meeting predefined intensity conditions and the like.

In some examples, setting a lower bound for intensity in an acoustic image (e.g., only displaying acoustic image data representative of acoustic signals above a predetermined intensity) can eliminate the inclusion of undesired background or ambient sounds and/or sound reflections from the acoustic image data. In other instances, setting an upper bound for intensity in an acoustic image (e.g., only displaying acoustic image data representative of acoustic signals below a predetermined intensity) can eliminate the inclusion of expected loud sounds in acoustic image data in order to observe acoustic signals ordinarily masked by such loud sounds.

Several display functions are possible. For example, similar to the frequency analysis/display discussed with respect to FIG. 9C, in some examples, the acoustic analysis system can cycle through a plurality of display images, each showing acoustic image data satisfying different intensity requirements. Similarly, in some examples, a user may scroll through a series of acoustic intensity ranges in order to view the locations in the acoustic image data having acoustic intensity in the given range.

Figure 11A:
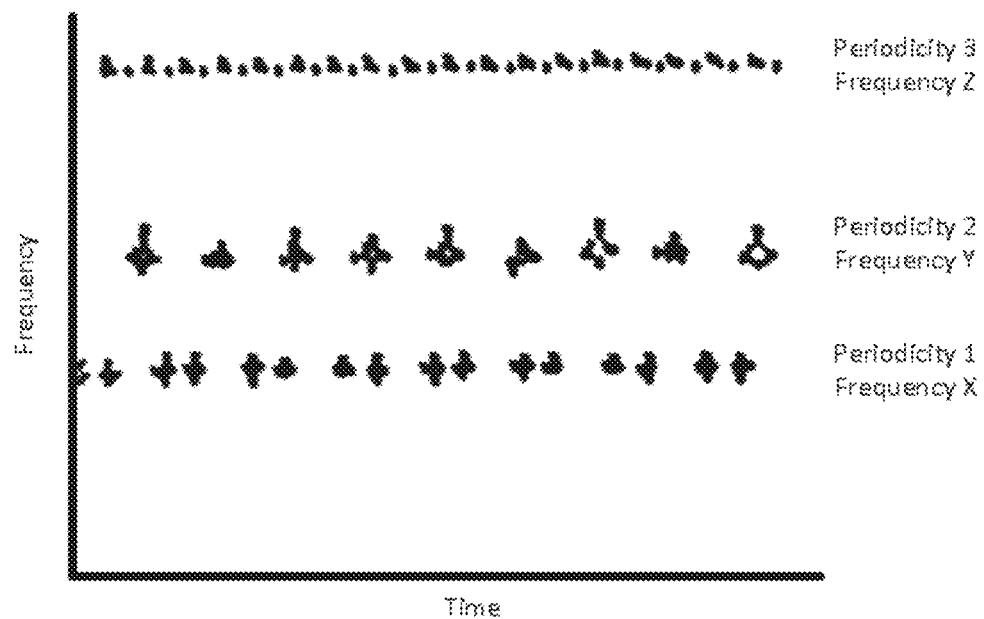
FIGS. 11A and 11B show exemplary plots of frequency vs. time of acoustic data in an acoustic scene.
Figure 11B:
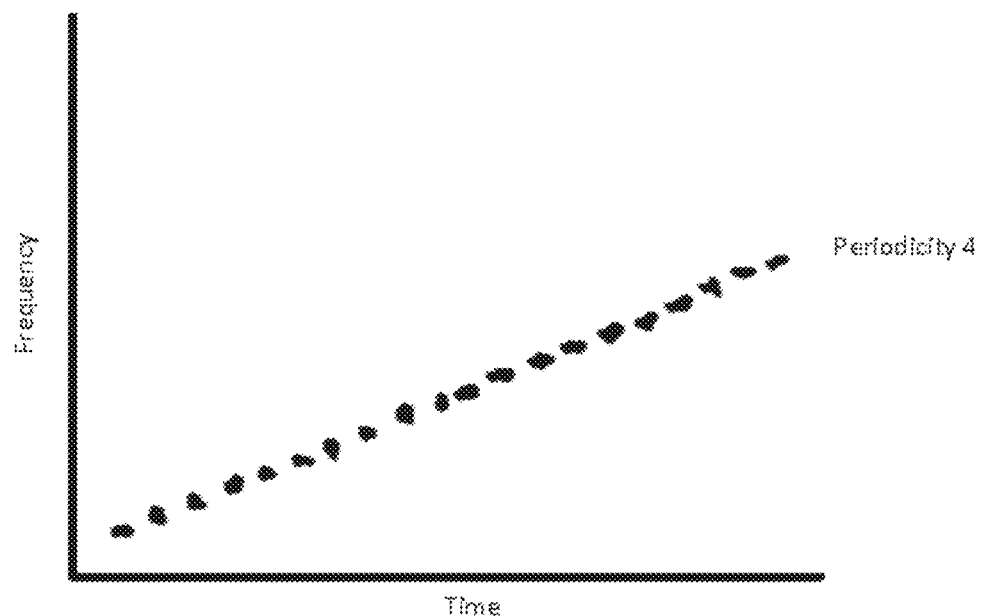

Another parameter that can be used to analyze acoustic data is a periodicity value of an acoustic signal. FIGS. 11A and 11B show exemplary plots of frequency vs. time of acoustic data in an acoustic scene. As shown in the plot of FIG. 11A, the acoustic data includes signals at a frequency X having a first periodicity, signals at a frequency Y having a second periodicity, and signals at a frequency Z having a third periodicity. In the illustrated example, acoustic signals having different frequencies may also include different periodicity in the acoustic signals.

In some such examples, acoustic signals can be filtered based on periodicity in addition or alternatively to frequency content. For instance, in some examples, multiple sources of acoustic signals in an acoustic scene may produce acoustic signals at a particular frequency. If a user wishes to isolate one such sound source for acoustic imaging, the user may choose to include or exclude acoustic image data from a final display image based on the periodicity associated with the acoustic data.

FIG. 11B shows a plot of frequency vs. time of an acoustic signal. As shown, the frequency increases over time approximately linearly. However, as shown, the signal includes an approximately constant periodicity over time. Thus, such a signal may or may not appear in an acoustic image depending on selected display parameters. For instance, the signal may at some points in time satisfy a frequency criteria for being displayed, but at other points in time, be outside of a displayed frequency range. However, a user could choose to include or exclude such a signal from acoustic image data based on the periodicity of the signals regardless of the frequency content.

In some examples, extracting acoustic signals of a particular periodicity can be helpful in analyzing a particular portion of a target scene (e.g., a particular piece of equipment or type of equipment that typically operates at a certain periodicity). For example, if an object of interest operates at a certain periodicity (e.g., once per second), excluding signals having periodicity distinct from this can improve acoustic analysis of the object of interest. For example, with reference to FIG. 11B, if an object of interest operates at periodicity 4, isolating signals having periodicity 4 for analysis may yield improved analytics of the object of interest. For example, the object of interest may emit sounds having periodicity 4, but increasing frequency, such as shown in FIG. 11B. This can imply that the properties of the object may be changing (e.g., increased torque or load, etc.) and should be inspected.

In an exemplary acoustic imaging process, background noises (e.g., floor noise in an industrial setting, wind in an outdoor environment, etc.) are generally not periodic while certain objects of interest within a scene emit period acoustic signals (e.g., machinery operating at a regular interval). Thus, a user may choose to exclude non-periodic acoustic signals from an acoustic image in order to remove background signals and more clearly present acoustic data of interest. In other examples, a user may be looking to find the source of a constant tone, and so may choose to exclude period signals from acoustic image data that may obscure viewing of a constant tone. In general, a user may choose to include in acoustic image data acoustic signals that are above a certain periodicity, below a certain periodicity, or within a desired range of periodicities. In various examples, periodicity can be identified by either a length of time between periodic signals or a frequency of occurrence of periodic signals. Similar to frequency as shown in FIG. 11B, an analysis of intensity at a given periodicity (e.g., due to an object of interest operating at that periodicity) can similar be used to track how acoustic signals from the object change over time. In general, in some embodiments, periodicity can be used to perform rate-of-change analysis for a variety of parameters, such as frequency, intensity, and the like.

Figure 12:
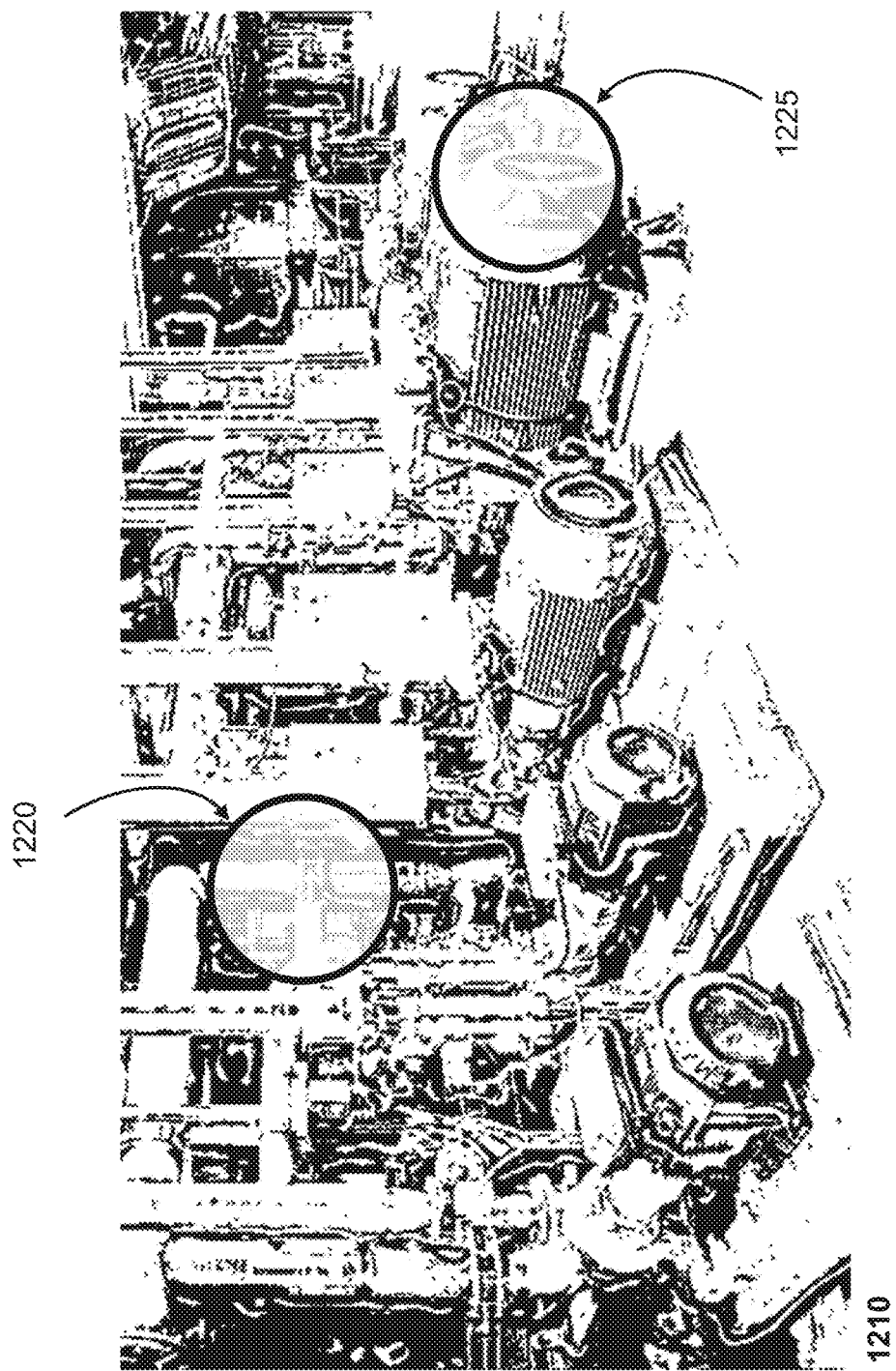
FIG. 12 shows an exemplary visualization of sounds in a target acoustic scene.

In some embodiments, various locations within a scene may emit acoustic signals which are continuous/ongoing as acoustic image data is captured. In such embodiments, an acoustic analysis system (e.g., acoustic imaging device 100, acoustic analysis system 200) may capture continuous or ongoing acoustic signals and present the acoustic signals to a user via acoustic image data, such as described herein. FIG. 12 provides an exemplary target scene 1210 including two locations, locations 1220 and 1225, emitting continuous acoustic signals. In the illustrated example, acoustic image data is combined with electromagnetic image data and shows acoustic signals present at locations 1220 and 1225.

However, in some cases, some locations within the target scene (e.g., target scene 1210) may emit acoustic signals that are intermittent and may not be captured by the acoustic analysis system on a regular basis. Such signals might therefore not be represented in acoustic image data displayed to a user at a given time when the user inspects the scene. This may lead to a failure to detect an acoustic signal of interest, such as an acoustic signal representing a problem that is otherwise detectable via acoustic imaging, since the acoustic signals were not present at the time of the inspection.

In some embodiments, all acoustic signals captured (e.g., acoustic signals that are continuous and acoustic signals that are intermittent) can be classified, such as being classified as a continuous acoustic signal or as an intermittent acoustic signal. Such embodiments may include systems being configured to track detected acoustic signals even if the signals are no longer present or not currently present (e.g., intermittent acoustic signals). Furthermore, systems may generate an acoustic image that includes information indicative of intermittent acoustic signals even if one or more of the acoustic signals are not present at the time of the inspection. Such embodiments may provide additional data to a user and reduce the number of acoustic signals of interest going undetected, for instance, due to not being present at the moment of inspection.

Figure 13:
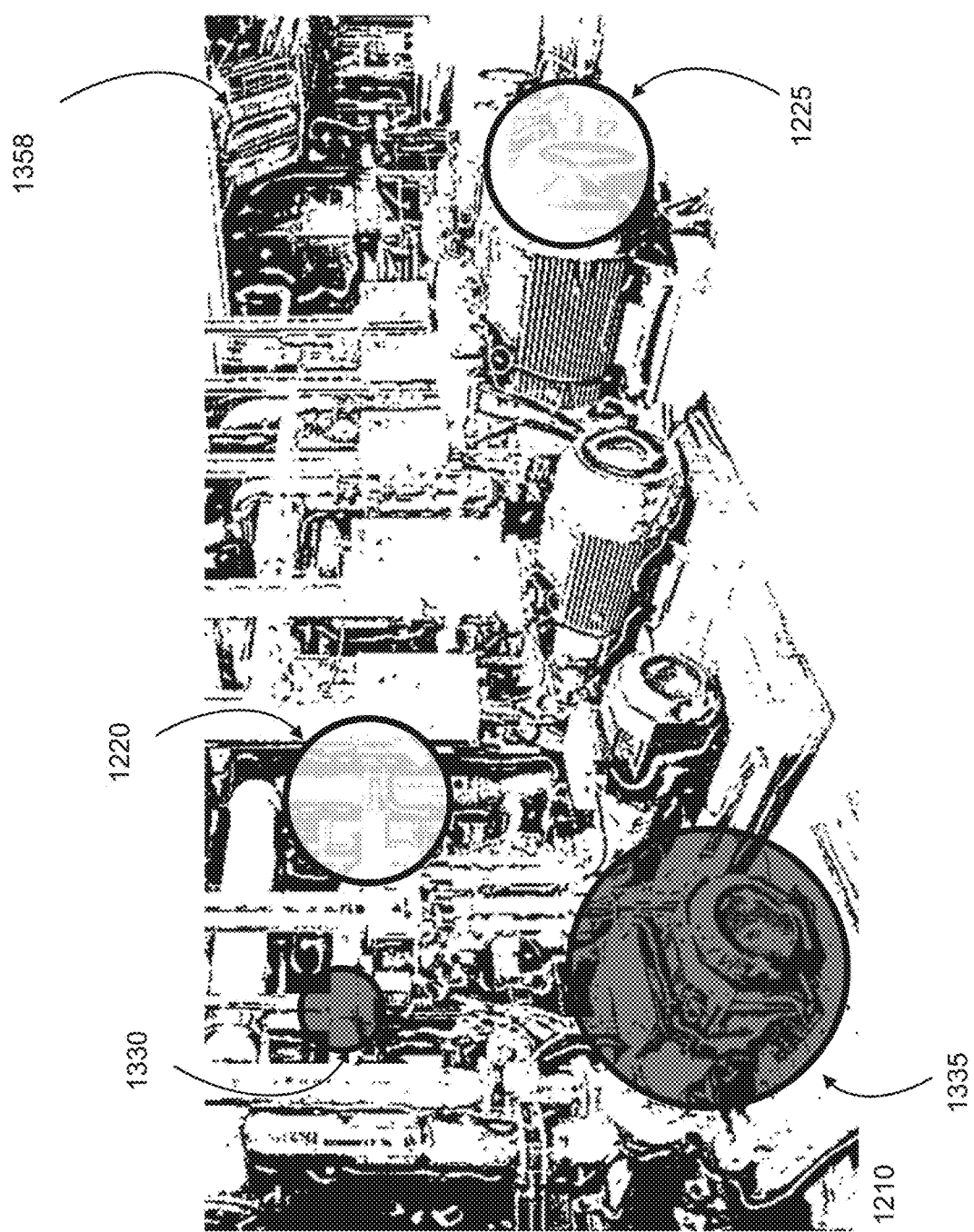
FIG. 13 shows an exemplary visualization of sounds in a target acoustic scene.

FIG. 13 provides an exemplary embodiment wherein an acoustic analysis system is configured to capture and display information regarding intermittent acoustic signals. As shown, target scene 1210 additionally comprises locations 1330 and 1335 emitting intermittent acoustic signals. Intermittent acoustic signals may comprise acoustic signals made erratically, infrequently and/or of interest after being emitted. For example, if a clanking or banging noise is present in a motor, such as at location 1335, it may be beneficial to provide a visualization of the noise even after the noise halts temporarily and/or during pauses of the noise and/or operation. In an example scenario, the acoustic signals emitted from location 1335 may have happened during a period of time when the acoustic target scene was not being observed by a user (e.g., overnight, over a lunch break, while the user was otherwise distracted, etc.) and would have been otherwise missed. Additionally or alternatively, intermittent acoustic signals may comprise acoustic signals that have a sudden change in acoustical parameters, such as the start-up or shut-down of equipment (e.g., motors or other machinery).

As mentioned elsewhere herein, in some embodiments, all acoustic signals captured (e.g., acoustic signals being emitted from locations 1220, 1225, 1330, 1335) can automatically be classified according to whether the signal is continuous or intermittent. In some embodiments, acoustic signals may automatically be classified based on the periodicity of the acoustic signal and/or the ratio of time the acoustic signal is present/not present within the target scene. For example, if an acoustic signal (e.g., acoustic signals being emitted from locations 1220 and 1225) have been present in all or most of the acoustic image data (e.g., acoustic image frames) captured, such acoustic signals may automatically be classified as continuous acoustic signals. Similarly, acoustic signals which happen sparingly, intermittently, and/or erratically may automatically be classified as intermittent sounds (e.g., acoustic signals being emitted from locations 1330 and 1335). Acoustic signals may also be classified manually, such as by a user via a user interface. In some embodiments, the user interface may be comprised within a housing for the acoustic analysis system, such as on or near the acoustic sensor array. Additionally or alternatively, the user interface may be located external to the housing for the acoustic analysis system, such as at a central server room, on a separate smart device (e.g., computer, phone, tablet), or the like.

As discussed herein, the acoustic analysis system may include a memory or be connected to an external memory for storing acoustic data or the like. This may include storing acoustic data or acoustic image data over a period of time to classify the acoustic signals from which the acoustic data or acoustic image data was generated (e.g., classify the acoustic signals as intermittent acoustic signals, continuous acoustic signals, or the like). In some embodiments, data may be stored (e.g., as metadata) along with the acoustic data/acoustic image data such as the time of capture, location, information about the target scene, or the like. Additionally or alternatively, such data may include further identification information for acoustic signals within the acoustic data. For example, the data may include a log of events (e.g., motors starting-up/shutting-down, flow rate through pipes, etc.) that happened within a particular location or the target scene while acoustic signals were being received. In further examples, various events comprised within the log of events may be associated with acoustic signals represented within the acoustic data. In some embodiments, as discussed herein, auxiliary data may be captured and/or received along with acoustic data, such as data from additional sensors (e.g., electromagnetic sensors, current sensors, voltage sensors, temperature sensors, humidity sensors, location data, weather data, or the like). In such examples, the auxiliary data or a subset thereof may be stored along with the log of events or used during analysis, such as when reviewing the log of events.

In some situations, it may be advantageous to distinguish acoustic signals based on their classification (e.g., continuous acoustic signals, intermittent acoustic signals, etc.). As shown in FIG. 13, various continuous acoustic signals (e.g., acoustic signals emitting from locations 1220 and 1225) are shown in a lighter tone whereas various intermittent acoustic signals (e.g., acoustic signals being emitted from locations 1330 and 1335) are shown in a darker tone. Various other distinguishing characteristics may be used to visually differentiate between continuous and intermittent acoustic signals, such as using different colors, shades, transparencies, shapes, sizes, symbols, or the like. Additionally or alternatively, acoustic signals may be filtered by their classification similar to filter systems described herein. For example, acoustic signals classified as a specific type (e.g., continuous, intermittent) may be displayed on a display and/or acoustic signals classified as a specific type may be omitted (e.g., not displayed). For instance, in some examples, a user can toggle between a traditional real-time display mode (where intermittent sounds may be missing if not present at the time) and an accumulated-time view, in which intermittent sounds may be visible even if not present at the time.

Similarly, particular acoustic signals may be magnified or emphasized, such as acoustic signals of a specific classification (e.g., continuous, intermittent). In some embodiments, acoustic signals can be emphasized by presenting them while excluding other acoustic signals, or by displaying other acoustic signals such that they are less distracting to a user (e.g., using a different palettization scheme such as using duller colors, making visualizations of such signals more transparent, using smaller indicators showing such signals, etc.). For example, acoustic signals emitted from location 1335 may have some similar attributes to acoustic signals emitted from location 1225 (e.g., similar intensity and/or frequency). However, since the acoustic signal emitted from location 1335 is classified as intermittent acoustic signals, acoustic image data representing the acoustic signal at location 1335 may be presented in a distinguishing way compared to continuous acoustic signals. For example, intermittent acoustic signals may be palletized to provide visual priority when compared to continuous acoustic signals (e.g., being shown as larger, in a different color palette, comprising more vibrant colors, a different level of blending with a corresponding electromagnetic image, etc.).

Additionally or alternatively, intermittent acoustic signals may be distinguished from one another based on the amount of time the acoustic signal persists. For instance, intermittent acoustic signals may be distinguished from one another based on the amount of time an intermittent acoustic signal is present and/or percent of time the intermittent acoustic signal is present. For instance, intermittent acoustic signals that are present more often or longer (e.g., within a given time frame) may be palletized with more vibrant colors, shown as larger, blended with a corresponding electromagnetic image at a different level, or the like.

Acoustic signals may be filtered using a classification type (e.g., continuous, intermittent) as well as by one or more other acoustic parameters (e.g., intensity, frequency, periodicity, apparent proximity, measured proximity, sound pressure, particle velocity, particle displacement, sound power, sound energy, sound energy density, sound exposure, pitch, amplitude, brilliance, harmonics, rates of change of any such parameters, primary frequencies, harmonics of a primary frequency, or the like). Furthermore, a user may combine requirements using any appropriate logical combinations, such as AND, OR, XOR, etc. For instance, a user may wish to display only acoustic signals being classified as intermittent acoustic signals AND having an intensity above a predetermined threshold. Additionally or alternatively, an acoustic analysis system can be configured to cycle through a plurality of classifications, such as shown with respect to frequencies in FIG. 9C and described elsewhere herein. In general, cycling may comprise only showing acoustic image data representing acoustic signals emitted from a location in the target scene which are a particular classification (e.g., continuous, intermittent). Such cycling through various displays can help a user visually distinguish information between different acoustic signals.

In some embodiments, auxiliary data from other sensors (e.g., electromagnetic sensors, current sensors, voltage sensors, temperature sensors, humidity sensors, location data, weather data, or the like) may be used to augment detection and diagnosis of acoustic signals. As described herein, auxiliary data may be displayed simultaneously with acoustic image data, such as blended with acoustic image data and/or overlaid with acoustic image data. For example, in embodiments wherein the auxiliary data comprises electromagnetic image data, the electromagnetic image data may be blended with the acoustic image data, such as using techniques described herein. Additionally or alternatively, other data, such as humidity data, location data, voltage/current data, or the like may be overlaid on the display and/or otherwise displayed along with acoustic image data. Furthermore, variations in data from other sensors may be used in combination with variations in detected acoustic signals (e.g., acoustic signatures) to diagnose occurrences or conditions within the scene.

In some cases, the acoustic analysis system may include an infrared camera module to detect infrared radiation and/or temperature information from the target scene. Variations in infrared radiation data and/or temperature data may be used in concert with detected acoustic signals to provide a better diagnosis than would be available from acoustic data alone. In some embodiments, an increase in temperature may be correlated to acoustic signals emitting from a particular location. For example, an abnormal temperature on a piece of rotating equipment may signify a shaft, bearing, or winding issue. Such an abnormal heat signature along with an acoustic signal analysis may help determine whether an issue is present and/or further identify the issue. Similarly, in some cases. the acoustic analysis system may include a visible light camera module to detect electromagnetic radiation within the visible light spectrum from the target scene. Variations in visible light image data may be used in concert with detected acoustic signals to provide a better diagnosis. For example, acoustic signals may be associated with particular objects within a target scene, such as known pieces of equipment, etc. Accordingly, visible light image data may be used to adjust the analysis of acoustic signals based on the detection of objects which could potentially occlude or modify the original acoustic signature (e.g., if an acoustic signal characteristic of a piece of equipment is present, but such equipment is occluded in the electromagnetic image data). For example, the system can be configured to eliminate or modify acoustic image data from areas of occlusion for the purpose of analysis.

The acoustic analysis system may be configured to determine locations of interest and/or locations not of interest within the target scene. Locations of interest may comprise one or more objects and/or areas comprised within the target scene, such as objects and/or areas emitting an acoustic signal of interest. In some examples, the acoustic analysis system may receive information from a user, such as via a user interface, regarding locations of interest within the target scene. In some embodiments, a user may mark locations of interest by highlighting various portions of the display (e.g., via a mouse, keypad, stylus/finger via a touch screen, etc.). In some embodiments, a user may provide various geometrical shapes to determine locations of interest, use a freeform method, or the like. In some examples, information from other sensors, such as an electromagnetic imaging sensor (e.g., infrared camera module, visible light camera module, or the like) may be used to determine locations of interest or locations not of interest within a target scene. For example, in some embodiments, a user may identify one or more locations of interest within the scene by selecting one or more such locations on a display while referencing electromagnetic image data of the scene. Various examples of identifying portions of a scene are described in U.S. Pat. No. 9,232,142, which is assigned to the assignee of the instant application and is incorporated by reference. In some examples, a user may select any size location of interest, including, for example, selecting an entire field of view or an entire span of image data as a location of interest. In some cases, a user or system can define a location of interest that is less than an entire field of view.

Acoustic signals emitted in locations of interest may be distinguished from acoustic signals emitted in locations not of interest. In some embodiments, acoustic signals for locations of interest may palletized differently (e.g., different colors, opacity, size) than locations not of interest. In further examples, the acoustic analysis system may be configured to present acoustic image data for locations of interest to the user and not present acoustic image data for locations not of interest. For example, locations 1220, 1225, 1330, and 1335 may considered locations of interest within the target scene. Locations 1225 and 1335 may comprise motors and locations 1220 and 1330 may comprise piping and/or electrical equipment. It may be important to a user to determine whether or not any abnormalities are present at such locations (e.g., via the presented acoustic signatures), since abnormalities in such locations may be detrimental. By contrast, in the illustrated example, location 1358 comprises an air vent. In some embodiments, noise emanating from the air vent in location 1358 (e.g., rattling from heating/cooling turning on, echoes from downstream/upstream from the air vent) may not be of interest to a user, and thus excluded from acoustic image data presented to a user.

As described, in some embodiments, locations may be deemed of interest based on inputs from a user, such as a user designating locations comprised within the acoustic target scene using a user interface. Additionally or alternatively, locations may be deemed of interest based on whether one or more alarm conditions are met.

An alarm condition may comprise, for example, various thresholds for acoustic parameters. For instance, an alarm condition may comprise an intensity (e.g., dB) threshold such that any acoustic signal having an intensity above a predefined intensity level and/or below a predefined intensity level satisfies the alarm condition. Additionally or alternatively, various acoustic parameters may be comprised within an alarm condition, such as intensity, frequency, periodicity, apparent proximity, measured proximity, estimated distance, sound pressure, particle velocity, particle displacement, sound power, sound energy, sound energy density, sound exposure, pitch, amplitude, brilliance, harmonics, rates of change of any such parameters, or the like.

In some embodiments, an alarm condition can include a hysteresis component. For example, in some embodiments, an alarm condition is satisfied if an acoustic parameter (e.g., an intensity for a given frequency range) meets a threshold value (e.g., in dB) a predetermined number of times within a given timeframe. In an example embodiment, an acoustic analysis system can detect an alarm condition if the acoustic intensity within a predetermined frequency range meets a predetermined intensity threshold more than 10 times in a day. Other numbers and time periods are possible. In some embodiments, such numbers and time periods can be selected by a user. In some examples, multiple such alarm conditions can be used simultaneously. For example, an alarm condition can be satisfied if an acoustic intensity meets a first threshold a first predetermined number of times, but also if the acoustic intensity meets a second threshold a second predetermined number of times. For instance, in addition to an alarm condition meeting a predetermined intensity threshold more than 10 times per day, an alarm condition could also be detected if the intensity meets a second, higher predetermined intensity threshold 5 times per day.

In some examples, one or more alarm conditions can be applied to a location of interest within a target scene. For example, in some embodiments, a location of interest can be defined (e.g., via an input from a user interface) and one or more alarm conditions can be applied thereto. In some such examples, such alarm conditions are not alarm conditions in locations outside of the location of interest, though other locations can similarly include associated alarm conditions.

In some embodiments, one or more alarm conditions can be received via a user interface. For example, a user can set one or more threshold conditions associated with one or more corresponding acoustic parameters to define one or more alarm conditions. Additionally or alternatively, in some examples, an acoustic analysis system can be configured to sample information (e.g., acoustic signals) from a target scene over time and establish one or more alarm conditions. For instance, the system can sample information from the target scene to establish typical operation within the target scene (e.g., typical acoustic intensity values). Such typical values can be used to establish one or more alarm conditions. In some examples, a user can command the system to sample the target scene and establish one or more alarm conditions.

In some examples, alarm conditions may comprise multiple thresholds or other conditions to be met, such as acoustic signals above a predetermined intensity while below a predetermined periodicity, below a predetermined intensity during a certain time of day (e.g., 8 pm to 6 am), or the like. In some examples, alarm conditions may be interdependent. For instance, in an example embodiment, threshold intensities may increase with frequency and/or decrease with distance. Additionally or alternatively, an alarm condition may comprise meeting one or more thresholds for a certain period of time, a certain number of times within a period of time, or for a certain percentage of time, or the like.

In some examples, one or more thresholds or conditions can determine the severity of an alarm. For example, in some embodiments, any acoustic signal registered above a threshold intensity (e.g., dB level) can satisfy an alarm condition, however various other parameters may determine the severity of the alarm, such as the location of the emitted acoustic signal, the frequency, the acoustic signature, auxiliary data from other sensors, or the like. In some embodiments, alarms may be distinguished by severity when presented to a user, such as discussed herein.

Furthermore, alarm conditions may be based on pattern detection, deviation from an acoustic signature, the presence of a known acoustic signature (e.g., a known problematic acoustic signature), machine learning algorithms, or the like. For example, various pieces of equipment (e.g., motor or other machinery) may emit acoustic signals during various events, such as while starting-up, shutting-down, or the like. In such examples, the acoustic analysis system may identify the various events, and a deviation from a regular acoustic signal for such an event may be an alarm condition.

In some embodiments, alarm conditions may comprise one or more thresholds associated with additional data, such as auxiliary data from sensors other than acoustic sensor arrays. Some such possible sensors are discussed herein. In some embodiments, known relationships between acoustic data and auxiliary data may be used when determining alarms conditions. For example, an alarm threshold associated with corona discharge in wires may be based on a number of detected corona discharges during a period of time. In some such examples, the number of detected corona discharges required to meet the threshold can depend on additional factors. For example, in some embodiments, the number of detected discharges satisfying an alarm condition can be based on the humidity and/or temperature in the surrounding environment, a voltage and/or current associated with the discharge, or the like. In some such examples, a certain number of corona discharge events may be normal or expected when humidity is high, but when the humidity is lower, the same number of detected corona discharge events may indicate malfunctioning equipment. Accordingly, using a multimodal alarm condition can help a system differentiate between expected or unexpected conditions. Other examples of multimodal alarm conditions include, for example, alarm conditions based on a time of day and/or year. For example, in some cases, an acoustic analysis system may be programmed with a first alarm condition for a first time period within a day (e.g., every day, every weekday, etc.), and a second alarm condition for times outside of the first time period. In general, any number of alarm profiles can be applied over corresponding periods of time.

Additionally or alternatively, in some examples, an alarm severity can be adjusted based on auxiliary data from one or more additional sensors. For example, with respect to the corona discharge example, humidity can be used to determine the severity of an alarm condition. In an example embodiment, an increase humidity may reduce the severity of the alarm and/or a decreased humidity may increase the severity of the alarm.

In some examples, a recency threshold can be used to generate an alarm condition based on intermittent signals such as discussed elsewhere herein. For instance, as described herein, in some examples, an acoustic analysis system can generate and display a display image having acoustic image data showing intermittent acoustic signals that are not present in real time, but were detected at a previous time. In some embodiments, such intermittent signals can satisfy an alarm condition, for example, having occurred within a predetermined range of time. Systems can be configured to include acoustic image data representing such acoustic signals, for example, as signals satisfying an alarm condition, even if such acoustic signals are not present at the time of generating or viewing the acoustic image data. Similarly, such timing (e.g., recency) thresholds can be used as a parameter in a multimodal alarm. For example, in some embodiments, systems can be configured to detect an alarm condition if an acoustic signal satisfied a threshold intensity within a recency threshold (e.g., within the past day, within the past hour, or the like).

In some examples, alarm conditions can vary across locations within a target scene. The location of an alarm condition can be generalized, for a specific target scene, for portions of a target scene, tied to particular areas/objects within the target scene, or the like.

In some embodiments, alarm conditions can be designated by a user, such as via a user interface as discussed herein. Additionally or alternatively, one or more alarm conditions can be designated by the acoustic analysis system. Similarly, a user and/or the acoustic analysis system may designate one or more locations for which the one or more alarm conditions apply. In an example embodiment, a user may identify objects within a scene (e.g., motor, gasket, fan, pipe, etc.) and provide corresponding alarm conditions for a location associated with each such object. Similarly, in some embodiments, an acoustic analysis system may identify various objects/areas within the scene and apply alarm conditions accordingly. Additionally or alternatively, in some examples, a user may select one or more alarm conditions from a list of predetermined alarm conditions for various objects.

An acoustic analysis system can be configured to notify a user when an alarm condition is met. In some embodiments, acoustic signals which satisfy one or more alarm conditions may be deemed acoustic signals of interest and displayed to a user via a display. In such embodiments, the acoustic analysis system may be configured to display acoustic signals of interest (e.g., acoustic signatures that meet one or more alarm conditions) and not display other sounds (e.g., acoustic signatures which did not meet one or more alarm conditions). Additionally or alternatively, acoustic signals of interest may be presented in a display image in a distinguishing way from acoustic image data representing acoustic signal that do not satisfy an alarm condition.

In some embodiments, the acoustic analysis system may distinguish acoustic signals of interest from one another. For example, one or more alarm conditions may correspond to a first severity level, which can correspond to acoustic signals that may be acoustic signals of interest to a user. One or more other alarm conditions may correspond to a second severity level corresponding to acoustic signals which may be problematic, and/or a third severity level corresponding to acoustic signals which are very problematic and may need immediate attention. In some such examples, acoustic signals which meet alarm conditions at various severity levels may be presented in a distinguishing way from acoustic signals that meet a different alarm condition or severity level.

In some embodiments, an acoustic analysis system can be configured to notify a user when an alarm condition is met, such as when an acoustic signal meets one or more alarm conditions. A notification may comprise a visual, audible, and/or tactical notification, such as a notification on a display, a tone, and/or a vibration. In some embodiments, acoustic image data representing acoustic signals that satisfy an alarm condition may be presented on a display image in a distinguishing way from acoustic image data representing acoustic signals that do not satisfy an alarm condition. In various examples, distinguishing the acoustic signals that satisfy an alarm condition can include providing a different palettization, opaqueness, intensity of color, periodic blinking, or the like. Additionally or alternatively, in some examples, acoustic signals satisfying an alarm condition may be represented via acoustic image data on a display whereas acoustic signals not satisfying an alarm condition are not represented on the display. As discussed herein, in some embodiments, a user can receive notifications via a user interface, display, or the like integrated with the acoustic analysis system. Additionally or alternatively, other notification mechanism may be used, such as a notification sent to a remote locations, such as a central station, through an operations management system, computerized maintenance management system, a smart device (e.g., tablet, phone, wearable, computer, etc.), or the like.

Figure 14:
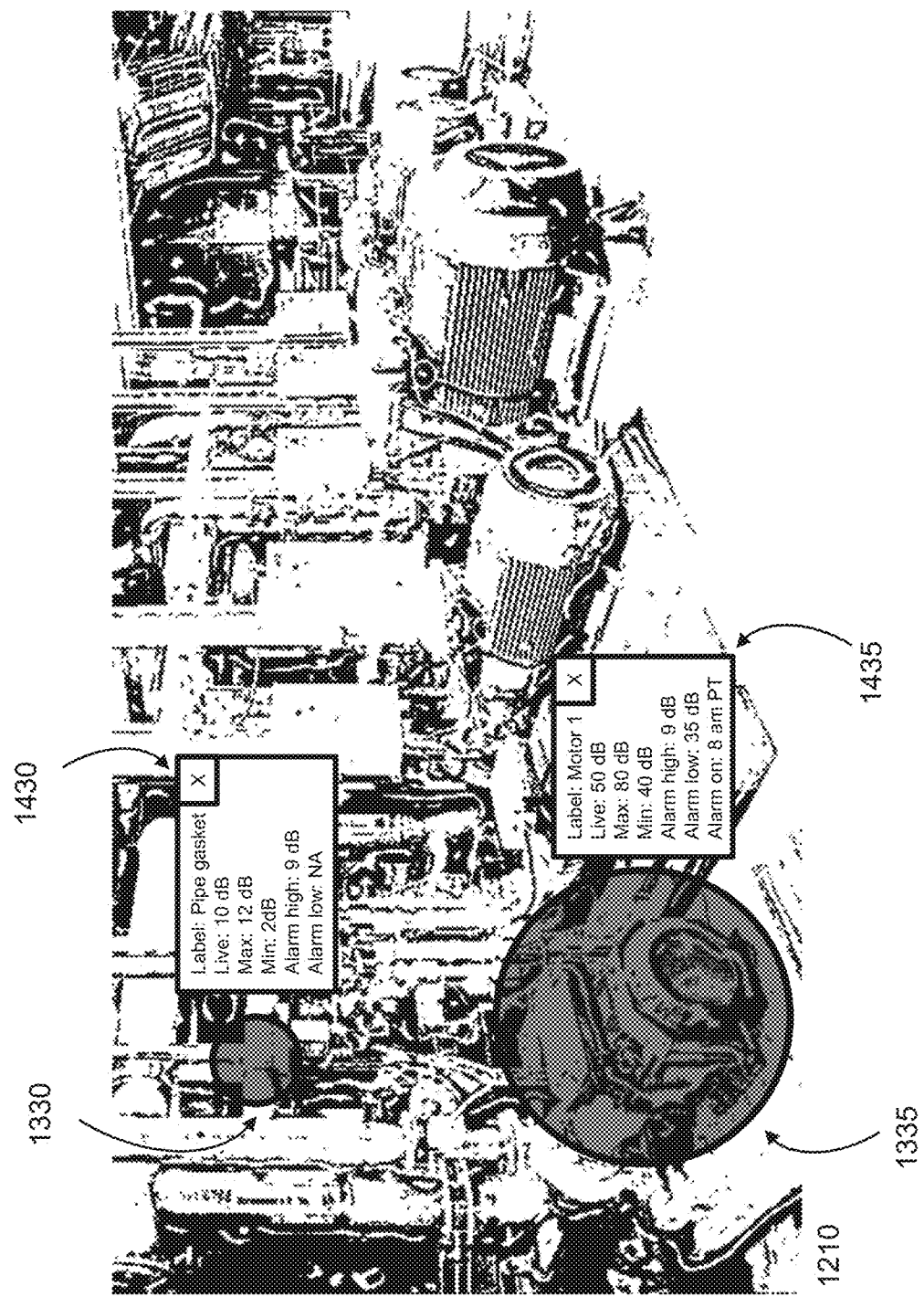
FIG. 14 shows an exemplary visualization and annotation of sounds in a target acoustic scene.

In some embodiments, the locations of alarm conditions may be labeled a display, such as on or near the portion of the acoustic image for the alarm condition. Additionally or alternatively, acoustic signals meeting alarm conditions may be labeled on a display, user interface, or the like. FIG. 14 shows an example acoustic image showing alarm information. As shown in the example of FIG. 14, labels 1430 and 1435 each comprise indicia representing various attributes of an acoustic signal emitting from a location of interest. In various examples, similar such labels can include information such as: a title/brief description (e.g., Pipe gasket, Motor 1); one or more values for acoustic parameters (e.g., dB level, frequency, or the like); historical minimum/maximum values for acoustic parameters; one or more alarm conditions (e.g., min value, max value, or the like); as well as alarm history, such as one or more times when an alarm condition was satisfied. In embodiments wherein an area/object comprises multiple alarm conditions, a label may include such multiple alarm conditions. Additionally or alternatively, a user may be able to toggle through each alarm condition, such as via a user interface. Similarly, in some embodiments, the acoustic analysis system can be configured to cycle through a plurality of such labels, providing labels to a user in a sequence.

As noted herein, in some cases, alarm conditions can be applied to locations of interest within a target scene. For example, in some embodiments, an acoustic analysis system is configured to notify a user of an alarm condition only if the alarm condition is detected within the location of interest associated with that alarm condition.

Various functionalities of components described herein can be combined. In some embodiments, features described in this application can be combined with features described in the following applications, each of which was filed on Jul. 24, 2019, and is assigned to the assignee of the instant application and which is incorporated herein by reference:

PCT patent application entitled "SYSTEMS AND METHODS FOR PROJECTING AND DISPLAYING ACOUSTIC DATA," having WIPO Publication No. WO2020/023622;

PCT patent application entitled "SYSTEMS AND METHODS FOR TAGGING AND LINKING ACOUSTIC IMAGES," having WIPO Publication No. WO2020/023633;

PCT patent application entitled "SYSTEMS AND METHODS FOR DETACHABLE AND ATTACHABLE ACOUSTIC IMAGING SENSORS," having WIPO Publication No. WO2020/023631;

PCT patent application entitled "SYSTEMS AND METHODS FOR ANALYZING AND DISPLAYING ACOUSTIC DATA," having WIPO Publication No. WO2020/023627; and PCT patent application entitled "SYSTEMS AND METHODS FOR REPRESENTING ACOUSTIC SIGNATURES FROM A TARGET SCENE," having WIPO Publication No. WO2020/023629.

Additionally or alternatively, features of this disclosure can be used in combination with features described in any one or more of the following patent applications, filed concurrently herewith and assigned to the assignee of the instant application, each of which is incorporated herein by reference:

U.S. Application No. 63/077,441, filed Sep. 11, 2020, entitled SYSTEMS AND METHODS FOR GENERATING PANORAMIC AND/OR SEGMENTED ACOUSTIC IMAGES; and U.S. Application No. 63/077,449, filed Sep. 11, 2020, entitled SYSTEMS AND METHODS FOR GENERATING PANORAMIC AND/OR SEGMENTED ACOUSTIC IMAGES.

Various embodiments have been described. Such examples are non-limiting, and do not define or limit the scope of the invention in any way.

For example, various embodiments of the acoustic analysis system described herein may include any of the following features, individually or in any combination: an acoustic sensor array comprising a plurality of acoustic sensor elements, each of the plurality of acoustic sensor elements being configured to receive acoustic signals from a target scene and output acoustic data based on the received acoustic signals; a display; a processor in communication with the acoustic sensor array and the display; the processor configured to receive a plurality of acoustic data sets from the acoustic sensor array, each of the plurality of acoustic data sets representative of the target scene at a different point in time, determine one or more locations within the target scene represented by the plurality of acoustic data sets, each of the one or more locations being a location of an acoustic signal emitted from the target scene, for each of the acoustic signals classify the acoustic signal as an intermittent acoustic signal or a continuous acoustic signal, generate accumulated-time acoustic image data based on the plurality of acoustic data sets, generate an accumulated-time display image comprising the accumulated-time acoustic image data, wherein acoustic signals classified as intermittent acoustic signals are distinguished from acoustic signals classified as continuous acoustic signals, and present the accumulated-time display image on the display.

In some cases, the processor is further configured to, for each of the acoustic signals classified as intermittent acoustic signals, calculate a normalized intermittent acoustic signal by averaging one or more of the acoustic parameters for the intermittent acoustic signal in each of the plurality of acoustic data sets the intermittent acoustic signal is present. The averaging of one or more of the acoustic parameters may comprise averaging the intensity level of the acoustic signals.

The acoustic analysis system may further comprise, individually or in any combination, a housing; the housing configured to house the acoustic sensor array and the processor; wherein the housing further comprises the display; wherein the display is external to the housing; wherein the processor is further configured to, for each the acoustic signals, determine a periodicity for the acoustic signal, wherein classifying an acoustic signal as an intermittent acoustic signal or a continuous acoustic signal is based on the determined periodicity of the acoustic signal.

The acoustic analysis system may be further configured such that, for each of the acoustic signals, the processor analyzes the acoustic signal to determine a ratio of time that the acoustic signal is present and time that the acoustic signal is not present in the plurality of acoustic data sets, wherein classifying an acoustic signal as an intermittent acoustic signal or a continuous acoustic signal is based on the ratio of time that the acoustic signal is present and the time that acoustic signal is not present in the plurality of acoustic data sets. In some cases, the processor is further configured to receive a log of events, the log of events comprising events which happened in the target scene during the time the sets of acoustic images were captured, and associate one or more events within the log of events with acoustic signals in the set of acoustic data. The log of events may further comprise data from one or more additional sensors. In some cases, the processor of the acoustic analysis system may be configured to generate real-time acoustic image data based on acoustic data received from the acoustic sensor array, generate a real-time display image including the real-time acoustic image data, and toggle between presenting the accumulated-time display image and the real-time display image on the display. The acoustic analysis system may further comprise a user interface, wherein the processor is configured to toggle between presenting the accumulated-time display image and the real-time display image on the display in response to a command received from the user interface.

In various embodiments, a method of generating an acoustic image may comprise receiving a plurality of acoustic data sets, each of the plurality of acoustic data sets representative of a target scene at a different point in time; determining one or more locations within the target comprising an acoustic signal emitted from within the target scene; classifying the acoustic signals as an intermittent acoustic signals or a continuous acoustic signals; generating accumulated-time acoustic image data based on the plurality of acoustic data sets; and generating an accumulated-time display image comprising the accumulated-time acoustic image data, wherein acoustic signals classified as intermittent acoustic signals are presented in a distinguishing way from acoustic signals classified as continuous acoustic signals within the accumulated-time display image.

Additional features include, individually or in any combination, wherein generating accumulated-time acoustic image data further comprises for each of the acoustic signals classified as intermittent acoustic signals, calculating a normalized intermittent acoustic signal by averaging one or more of the acoustic parameters for the intermittent acoustic signal over a plurality of acoustic data sets; determining one or more locations of interest within the target scene, wherein generating the accumulated-time display image comprises visually distinguishing the one or more locations of interest from locations not considered locations of interest; further comprising receiving electromagnetic image data, the electromagnetic image data being representative of electromagnetic radiation from the target scene, and determining one or more locations of interest is based on the received electromagnetic image data; determining, for each of the one or more acoustic signals, a periodicity for the acoustic signal, wherein classifying an acoustic signal as an intermittent acoustic signal or a continuous acoustic signal is based on the periodicity of the acoustic signal.

Various embodiments may further comprise determining a ratio of time that each acoustic signal is present to the time that the acoustic signal is not present in the plurality of acoustic data sets, wherein classifying an acoustic signal as an intermittent acoustic signal or a continuous acoustic signal is based on the ratio of time that acoustic signal is present to the time that the acoustic signal is not present in the plurality of acoustic data sets; determining one or more alarm conditions, each of the one or more alarm conditions comprising a threshold for an acoustic parameter; comparing received acoustic signals to the one or more alarm conditions; and providing a notification if a received acoustic signal satisfies an alarm condition; wherein generating the display image further comprises creating one or more labels for locations within the target scene, wherein each of the one or more labels comprises information regarding: a title, a brief description of the location, one or more current values for acoustic parameters, one or more alarm conditions for the location, and/or an alarm history; and further comprising generating a real-time display image based on a most recent one of the plurality of acoustic image data sets, and toggling between the real-time display image and the accumulated-time display image.

The various embodiments described above can be combined to provide yet further embodiments. All of the U.S. and foreign patents, patent application publications, and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An acoustic analysis system comprising:
an acoustic sensor array configured to output acoustic data based on one or more acoustic signals received from a scene during a period of time; and
a processor in communication with the acoustic sensor array, wherein the processor is configured to:
receive the acoustic data from the acoustic sensor array, wherein at least a portion of the acoustic data represents an intermittent acoustic signal that was present in the scene at different times and not present at other times; and
generate a display image comprising acoustic image data based on the acoustic data received from the acoustic sensor array, wherein the display image includes a visual representation of the intermittent acoustic signal, the visual representation having a visual characteristic that reflects a presence characteristic of the intermittent acoustic signal in the scene during the period of time.

2. The acoustic analysis system of claim 1, wherein the presence characteristic is a length of time that the intermittent acoustic signal was present in the scene during the period of time.

3. The acoustic analysis system of claim 1, wherein the presence characteristic is a percentage of the period of time in which the intermittent acoustic signal was present in the scene.

4. The acoustic analysis system of claim 1, wherein the presence characteristic is indicative of how often the intermittent acoustic signal was present in the scene during the period of time.

5. The acoustic analysis system of claim 1, wherein the presence characteristic is indicative of how often the intermittent acoustic signal was present in the scene within an amount of time.

6. The acoustic analysis system of claim 1, wherein the acoustic data represents different intermittent acoustic signals that were present in the scene, and the display image includes visual representations of the different intermittent acoustic signals, each visual representation of a respective intermittent acoustic signal including a visual characteristic that depends on presence characteristic of the respective intermittent acoustic signal in the scene during the period of time.

7. The acoustic analysis system of claim 6, wherein the visual characteristic of each visual representation reflects a total amount of time that the respective intermittent acoustic signal was present in the scene during the period of time.

8. The acoustic analysis system of claim 6, wherein the visual characteristic of each visual representation reflects a percentage of the period of time that the respective intermittent acoustic signal was present in the scene.

9. The acoustic analysis system of claim 6, wherein the visual characteristic of each visual representation reflects how often the respective intermittent acoustic signal was present in the scene during the period of time.

10. The acoustic analysis system of claim 1, wherein the visual characteristic is a palletized color or other graphical representation that reflects the presence characteristic of the intermittent acoustic signal.

11. The acoustic analysis system of claim 1, wherein the visual characteristic is a size of the visual representation, wherein the size reflects the presence characteristic of the intermittent acoustic signal.

12. The acoustic analysis system of claim 1, wherein the visual characteristic is a graphical form or symbol that reflects the presence characteristic of the intermittent acoustic signal.

13. The acoustic analysis system of claim 1, wherein the display image includes an alarm based on a recency of presence of the intermittent acoustic signal in the scene during the period of time.

14. An acoustic analysis system comprising:
an acoustic sensor array configured to output acoustic data based on one or more acoustic signals received from a scene during a period of time; and
a processor in communication with the acoustic sensor array, wherein the processor is configured to:
receive the acoustic data from the acoustic sensor array, wherein at least a portion of the acoustic data represents an intermittent acoustic signal that was present in the scene at different times;
generate a display image comprising acoustic image data based on the acoustic data received from the acoustic sensor array; and
generate an alarm based on a presence characteristic of the intermittent acoustic signal in the scene during the period of time.

15. The acoustic analysis system of claim 14, wherein the alarm is generated based on a time of presence of the intermittent acoustic signal in the scene during the period of time.

16. The acoustic analysis system of claim 15, wherein the alarm is generated when the intermittent acoustic signal was present in the scene within a predetermined range of time.

17. The acoustic analysis system of claim 14, wherein the alarm is generated when an intensity of the intermittent acoustic signal during the period of time satisfies a threshold intensity.

18. The acoustic analysis system of claim 14, wherein the alarm is generated based on a recency of presence of the intermittent acoustic signal and an intensity of the intermittent acoustic signal.

19. A method of acoustic analysis, comprising:
receiving acoustic data from an acoustic sensor array, wherein at least a portion of the acoustic data represents an intermittent acoustic signal that was present in a scene at different times and not present at other times during a period of time; and
generating a display image comprising acoustic image data based on the acoustic data received from the acoustic sensor array, wherein the display image includes a visual representation of the intermittent acoustic signal having a visual characteristic that reflects a presence characteristic of the intermittent acoustic signal in the scene during the period of time.

20. The method of acoustic analysis of claim 19, further comprising generating an alarm when the presence characteristic of the intermittent acoustic signal in the scene satisfies an alarm condition.

* * * * *